United States Patent
Dudley et al.

(10) Patent No.: US 7,016,389 B2
(45) Date of Patent: Mar. 21, 2006

(54) DIODE PUMPED LASER WITH INTRACAVITY HARMONICS

(75) Inventors: David R. Dudley, El Granada, CA (US); Norman Hodgson, San Francisco, CA (US); Hanna J. Hoffman, Palo Alto, CA (US); Oliver Mehl, Mountain View, CA (US)

(73) Assignee: Spectra Physics, Inc., Mountain View, CA (US)

( * ) Notice: Subject to any disclaimer, the term of this patent is extended or adjusted under 35 U.S.C. 154(b) by 0 days.

(21) Appl. No.: 10/351,467

(22) Filed: Jan. 24, 2003

(65) Prior Publication Data

US 2004/0146076 A1 Jul. 29, 2004

(51) Int. Cl.
*H01S 3/091* (2006.01)
*H01S 3/094* (2006.01)

(52) U.S. Cl. ............... 372/75; 372/22; 372/21; 372/92; 372/96; 372/99

(58) Field of Classification Search ............... 372/75, 372/43–50, 22, 92–96, 99, 21
See application file for complete search history.

(56) References Cited

U.S. PATENT DOCUMENTS

| | | | | |
|---|---|---|---|---|
| 5,191,588 | A | | 3/1993 | Dacquay ........................ 372/22 |
| 5,278,852 | A | | 1/1994 | Wu et al. ........................ 372/22 |
| 5,410,559 | A | | 4/1995 | Nighan, Jr. et al. ............. 372/19 |
| 5,850,407 | A | * | 12/1998 | Grossman et al. ............. 372/22 |
| 5,898,717 | A | | 4/1999 | Yin .............................. 372/22 |
| 5,943,351 | A | | 8/1999 | Zhou et al. .................... 372/22 |
| 5,991,317 | A | * | 11/1999 | Nighan et al. ................ 372/22 |
| 6,002,695 | A | | 12/1999 | Alfrey et al. .................. 372/22 |
| 6,061,370 | A | * | 5/2000 | Yin .............................. 372/22 |
| 6,157,663 | A | * | 12/2000 | Wu et al. ....................... 372/75 |
| 6,185,235 | B1 | | 2/2001 | Cheng et al. .................. 372/39 |
| 6,229,829 | B1 | * | 5/2001 | Yin .............................. 372/22 |
| 6,241,720 | B1 | | 6/2001 | Nighan, Jr. et al. ............. 606/3 |
| 6,327,281 | B1 | * | 12/2001 | Yin .............................. 372/22 |
| 6,366,596 | B1 | * | 4/2002 | Yin et al. ....................... 372/92 |
| 6,389,043 | B1 | | 5/2002 | Nelte et al. ..................... 372/2 |
| 6,590,911 | B1 | * | 7/2003 | Spinelli et al. ................ 372/22 |
| 6,683,894 | B1 | * | 1/2004 | Lee et al. ...................... 372/20 |
| 2004/0028090 | A1 | * | 2/2004 | Pask et al. ....................... 372/3 |

OTHER PUBLICATIONS

Hodgson et al, CLEO 2001 Proceedings, Paper CThC4, "Diode end-pumped, $TEM_{oo}$ Nd:$YVO_4$ Laser with output power greater than 12 W at 355 nm", Technical Digest, IEEE/Lasers and Electro-Optics Society.
Paper CTu13 to Dudley et al presented in CLEO 2002 proceedings and titled "Direct 880 nm Diode pumping of Vanadate Lasers.".

* cited by examiner

*Primary Examiner*—Minsun Oh Harvey
*Assistant Examiner*—Delma R. Flores-Ruiz
(74) *Attorney, Agent, or Firm*—Heller Ehrman LLP

(57) ABSTRACT

A diode end-pumped solid state laser is provided which produces improved power output, long term stability and improved conversion efficiency from the pumping power, high as well as low power operation while maintaining certain desirable common characteristics such as $TEM_{oo}$ operation, circular outputs, readily aligned systems and compatibility with long lifetime for all components. The invention intracavity conversion to second, third and higher harmonics in several different spectral regimes. The invention also addresses the aspects of design flexibility, seeking in certain embodiments to provide a single platform for providing several harmonic beams.

42 Claims, 8 Drawing Sheets

DIODE PUMPED LASER WITH INTRACAVITY HARMONICS

BACKGROUND

1. Field of the Invention

The present invention relates to the field of frequency converted solid state laser, and in particular to intracavity frequency conversion.

2. Description of the Related Art

Laser radiation at visible and UV wavelengths with high average power and repetition rates is useful for numerous industrial applications ranging from via hole drilling, laser texturing, micromachining, stereophotolithography, memory repair and direct writing. Medical applications including surgical and other therapeutic procedures can also benefit from availability of high power at shorter wavelengths, especially from compact and reliable devices.

In conventional solid state laser systems based on second, third or fourth harmonic generation, the output is typically produced in an extracavity module, using one or more nonlinear crystals. Generally, the art recognizes that the efficiency of the external harmonic conversion is limited by the available peak power of the fundamental laser and damage to the coatings of the nonlinear crystal. Most diode pumped laser systems focus the fundamental beam into the crystal to generate the peak intensities needed for high conversion. On the other hand, coatings applied to the crystal as well as to other optical elements in the harmonics path are known to be increasingly susceptible to damage as the power density or the fluence increases, hence the efficiency of the conversion process is limited by lifetime considerations. These limitations tend to become progressively more severe at higher harmonics because of the propensity for damage to coatings and even bulk materials to occur more readily at shorter wavelengths especially as the higher harmonics get deeper into the UV.

One approach to increasing powers available at harmonic wavelengths is to increase the peak power of the fundamental laser, thereby achieving the same conversion at lower pulse energies and relaxing focusing requirements of the beam incident on the crystal. This can be achieved by increasing pulse energies or by going to shorter pulses. In diode pumped systems, both of those options are subject to inherent limitations, especially for higher repetition rates. For many applications, repetition frequencies of interest are generally in excess of 1 kHz, and in some cases over 100 kHz. For such systems, requiring also higher energy outputs lead to average powers that are not consistent with stable $TEM_{00}$ operation of the cavity due to thermal lens and stress aberration considerations. It is also known that for diode end-pumped lasers, the pulse-to-pulse stability is reduced and the pulse duration increases as the repetition rate is increased. Thus, both average and peak power scalability in diode end-pumped systems are limited, even as more diode pump power becomes available. For example, the maximum achievable single transverse mode power per rod is generally limited to about 30 W per rod from standard commercial diode end-pumped laser systems based on $Nd:YVO_4$ or Nd:YAG lasers. Using two rods and additional pump ports has demonstrated pulsed power scaling of up to 50 W (see Hodgson et al, CLEO 2001 Proceedings, Paper CThC4) but this comes generally at the expense of longer, more complex cavities and longer pulse durations, as well as decreased output power stability at higher repetition rates. Correspondingly, the state-of-the-art for external frequency conversion of diode end-pumped lasers from practical $TEM_{00}$ mode lasers has so far been limited to about 20–25 W for the green second harmonic and about 10 W for the UV third harmonic (see Hodgson et al ref. Above). Thus, even assuming optimized end-pumped configuration with up to 45–50% diode-to-$TEM_{00}$ fundamental output, the 355 nm UV radiation is produced with generally less than 15% diode-to-UV optical efficiency.

It has been recognized by the known art that certain advantages and improvements to the harmonic conversion process could be obtained with an intra-cavity conversion architecture. Intracavity frequency doubling has been successfully implemented for CW and quasi-CW diode end-pumped solid state lasers. For example, the Millenia commercial system available from Spectra-Physics can produce output powers in excess of 6 W in the green using a fiber-coupled diode end-pumped $Nd:YVO_4$ gain material and an intra-cavity doubling scheme, with a non-critically phase-matched (NCPM) LBO crystal. Techniques and structures for intra-cavity tripling into the UV for CW lasers have also been disclosed. See for example U.S. Pat. No. 6,241,720 to Nighan et al and U.S. Pat. No. 6,389,043 Nelte and Hargis, among others. Among high power diode pumped pulsed Intracavity doubled lasers, there are a number of commercial products available, for example a 50 W system from Lee lasers. However, most of the intracavity converted pulsed lasers available to date, have multi-mode beam quality, which provides a poor match to many industrial applications of interest.

The known art recognizes that the primary advantage of intra-cavity frequency conversion is the ability to rely on the high power circulating inside the laser resonator to provide harmonic conversion with higher overall efficiency than is possible in an extra-cavity configuration. One key benefit of cycling the power through the crystal is being able to achieve the desired conversion while limiting the power densities incident on the crystal. As a consequence, the crystals may exhibit generally longer lifetimes. As a second benefit, the power cycling through the crystal allows for improved pulse-to-pulse stability. The possibility that some of these advantages may be attendant to pulsed cavities including a Q-Switch were recognized nearly a decade ago, for example, by Dacquay in U.S. Pat. No. 5,191,588 and Wu in U.S. Pat. No. 5,278,852. Both of these early patents failed, however, to appreciate the difficulties inherent to using dichroically coated elements to extract and/or isolate the higher harmonics when the infrared fundamental laser beam is optically coupled and collinear with the generated harmonic radiation. Attempts to remedy these deficiencies were presented by Yin in U.S. Pat. No. 5,898,717 and by Alfrey in U.S. Pat. No. 6,002,695 which describe embodiments for UV extraction based on one or more Brewster cut prisms as beam isolation or output elements included in resonant cavities containing a gain medium and two or more nonlinear crystals used for the harmonic conversion process. Combinations of dichroic or trichroically coated elements cut near the Brewster surface were also shown in Yin's U.S. Pat. No. 6,061,370 directed to a fourth harmonic laser and U.S. Pat. No. 6,366,596 to Yin et al, which disclosed a diode-pumped laser with intracavity harmonic as well as parametric frequency conversion.

Alternative variations of intracavity conversion configurations included use of sub-resonators. For example, Zhou et al in U.S. Pat. No. 5,943,351 teaches use of sub-resonators for circulating the second harmonic and a variety of multi-coated optics for extracting a desired UV beam. As shown in this patent, the fundamental resonator and the harmonic sub-resonators are generally constructed linearly, so as to provide multiple passes through successively higher harmonic crystals. Also disclosed in this patent are intracavity UV reflecting mirrors which are useful in blocking the UV radiation from reflecting back towards the main cavity and other crystals b, However, Zhou et al failed to note that such constructions of harmonic sub-cavities require dichroic and trichroically coatings, which are known to be difficult to manufacture in practice and are generally more susceptible to damage than standard coatings, especially when subjected to high intensity UV beams. Improvements suggested by Yin in U.S. Pat. No. 6,327,281 provided for a sub-resonator only for the second harmonic and further including angled optics and dispersive surfaces to separate the different wavelengths, thereby obviating the need to place a highly reflective 355 nm mirror within the cavity. Unlike spectral separation which tends to be imperfect due to leakage of undesirable frequencies, the spatial separation means shown by Yin generally provide for nearly pure spectral content, as long as the cavity design allows for sufficient angular separation. In practice, the use of dispersive surfaces such as intra-cavity prisms or Brewster plates tend to lead to long asymmetric resonators with each additional such element adding to the design complexity. In high power laser operation, this may adversely affect the stability conditions for $TEM_{00}$ operation and complicates the laser alignment. Longer resonators may also result in longer pulse durations than is desired for the applications contemplated.

An elegant approach to providing spatial beam separation with the fewest number of added optical elements was described by Grossman et al in U.S. Pat. No. 5,850,407 wherein a Brewster-cut tripler crystal was described which was uncoated on the sensitive exit side. This allows for sufficient spatial separation of the fundamental, green and UV beams without adding additional dispersive surfaces while reducing the number of required coatings especially on the sensitive exit face of the intracavity tripler crystal. Advantageously, this technique provides for a more compact resonator as compared to designs including one or more intracavity prisms, at the same time avoiding the need for lossy and damage susceptible dichroic and anti-reflective (AR) coatings. Including a Brewster cut crystal in the cavity results, however, in an elliptically-shaped cavity mode. Although such an elliptical beam can be made more circular through use of tilted, curved reflectors, cylindrical optics or a fused silica Littrow prism, including such optics in the cavity will complicate the overall resonator design, potentially negating the purpose of the original compact, readily aligned construction. The system with a Brewster cut tripler also does not readily extend to higher harmonics, being suited only to the specific harmonic for which it is designed.

Although recognizing the importance of stable $TEM_{00}$ operation in intracavity converted lasers, the known art has also failed to address the ramifications of requiring operation in the stable regime in the presence of intracavity elements across a range of output parameters. In particular, analysis and discussions of the known art generally concentrated on various harmonic extraction schemes while neglecting due consideration of issues affecting pulsed lasers with power scaling capability in a practical setting.

Generally, it is well known in the art of solid state lasers that, as the pump power incident on a laser crystal is increased, thermal lensing becomes a limiting factor for diffraction limited operation. It is known for example that for gain media such as $Nd:YVO_4$ and $Nd:YAG$ the thermal lens becomes very strong as the power density is increased with focal lengths becoming as short as 10 cm at elevated power levels. Although such a strong lens can be compensated by clever cavity design, the aberrations in the lens eventually degrade the single mode performance of the laser.

Additionally, there are trade-offs between the pump spot size and laser beam mode size in optimizing a design for $TEM_{00}$ operation. This in turn sets limits on the spot sizes that may be utilized in the nonlinear crystals, thus affecting the overall harmonic conversion efficiency. For example, the known art as exemplified in U.S. Pat. No. 6,366,596 to Yin et al teaches an intracavity tripled laser where the fundamental laser mode size is between 0.8 and 2.0 mm and the laser medium has a diameter of about 1.6 to 4 times the fundamental beam diameters. Setting the laser parameters in this manner is, however, neither necessary nor sufficient in terms of providing stable $TEM_{00}$ operation over a desirable range of repetition rates at either low or high power.

One area of concern to intracavity converted lasers involves methods for extraction of the harmonic beam. In particular, it has already been recognized that beam separation is a particularly challenging aspect of any intracavity harmonic conversion process, especially for high power systems. This is a direct result of the fact that the intracavity conversion process generally involves collinearly coupled fundamental and harmonics co-propagating in at least a portion of the same cavity. Therefore, extracting one particular desirable wavelength while suppressing others will, as a rule, require more complex separation schemes as compared with those commonly utilized in externally converting systems. The difficulties are compounded at the high peak powers characteristic of pulsed resonators, and an intracavity pulsed system is known to be very demanding of the resonator optics, especially if any light in the UV portion of the spectrum is produced, as optics are generally become less damage resistant as the wavelength becomes shorter. Thus, circulating UV light, even in relatively small amounts can damage AR coatings including those protecting sensitive laser rod and nonlinear crystals.

Typically, optics used in known systems for beam separation involved dichroic and trichroic coatings or dispersive surfaces, each with its attendant disadvantages and challenges. Thus, dichroic or trichroic coatings with the requisite reflection and transmission properties can be difficult to design and they remain generally susceptible to damage. For example, coating a standard flat optic for high transmission in the green and UV and high reflection in the infrared is known to be a difficult problem. With all three wavelengths incident on the same spot, an imperfect coating can undesirably absorb some of the UV light, becoming "thermalized". This can result not only in unpredictable power output drops but in general instability of the laser.

Accordingly, the known art, taken as a whole, has failed to consider aspects of intracavity conversion that are important to practical and readily manufacturable laser systems with output in one or more harmonics of a fundamental. Many issues associated with achieving these desirable characteristics concerned with intracavity conversion have been overlooked.

SUMMARY OF THE INVENTION

The present invention seeks to ameliorate at least some of the known art deficiencies discussed above. It is especially desirable to provide design platforms that are flexible enough to be adaptable to different application environments, including low and high power regimes, while maintaining certain desirable common characteristics. These include stable operation of the fundamental radiation resulting in $TEM_{00}$ output harmonics, circular outputs, readily aligned systems, high overall efficiency and compatibility with long lifetime of all components. At least some of these and other objectives described herein will be met by embodiments of the present invention.

One object of the present invention is to provide one or more harmonic wavelengths from a diode end-pumped pulsed solid state laser utilizing intracavity harmonic conversion. With the inventive constructions disclosed herein, the use of intracavity techniques can provide high efficiency and longer lifetime for harmonic wavelengths than comparable extra-cavity techniques by exploiting the higher intensities of the fundamental beam available inside the cavity to thereby achieve efficient harmonic conversion with lower power densities incident on the crystals.

It is a further object to achieve the improved performance at harmonic wavelengths using simple cavities with relatively few optical components and slowly varying fundamental spot sizes in the harmonic generator crystals.

In one embodiment of the present invention, a diode pumped intracavity converting laser is provided. The laser comprises at least two high reflector mirrors defining a resonator cavity at a fundamental wavelength. A first Nd-doped gain medium may be positioned in the resonator cavity, producing radiation at said fundamental wavelength. The laser may have a first diode pump supplying pump beam of up to a maximum power at a pump wavelength to the gain medium. At least one harmonic wavelength generator may be included and situated within the resonant cavity and optically coupled to it through at least one dichroically coated optic. The laser may have an outcoupler extracting a desired harmonic wavelength without damage due to leakage of the harmonic radiation to the gain medium and other optical components within said cavity. The resonator cavity and gain medium is adapted to operate in a $TEM_{00}$ mode with a thermal lens in the cavity that is less than 12 D at all pump power levels up to the maximum, such that the fundamental beam diameter in the harmonic wavelength generator decreases as the pump power increases.

In another embodiment of the laser according to the present invention, the Nd-doped gain medium is vanadate, YAG, $YAlO_3$ or YLF. Preferably, in some embodiments the harmonic output beam is circular, with a high degree of roundness. In alternative embodiments, the pump wavelength may be selected to provide direct excitation of the upper laser level of the gain medium, such as but not limited to about 880 nm in one embodiment of the present invention. It should be understood of course, that other ranges may also be used, depending on the gain medium. For higher power, the laser may be pumped from two sides. The harmonic wavelength generator preferably comprises a non-linear crystal providing radiation at a second harmonic wavelength. The fundamental beam diameter in the crystal may be large enough to obviate the need for walkoff compensation.

In a further another embodiment of the present invention, a diode pumped intracavity tripled laser is provided. The laser has at least two high reflector mirrors defining a resonator cavity at a fundamental wavelength; a first Nd-doped gain medium positioned in the resonator cavity, producing radiation at said fundamental wavelength; a first diode pump supplying pump beam of up to a maximum power at a pump wavelength to the gain medium; and a Q-switch for pulsing the laser up to a maximum repetition rate. The resonator cavity and gain medium may be adapted to operate in a $TEM_{00}$ mode at all pump power levels up to said maximum power. The laser may include a first nonlinear crystal situated within said resonant cavity producing a second harmonic beam; a second nonlinear crystal situated within said resonant cavity producing a third harmonic beam; and an outcoupler for extracting the third harmonic wavelength without damage said gain medium or other optical components within said resonant cavity, wherein the second harmonic conversion efficiency is detuned from its maximum value. In some embodiments, the laser may include a thermal lens of the laser cavity is less than about 12 D. In other embodiments, the laser has a thermal lens that is less than about 6 D.

In a still further embodiment of the present invention, a diode pumped intracavity converted laser is provided wherein a resonator cavity and gain medium are adapted to operate in a $TEM_{00}$ mode in the presence of at least one intracavity lens configured and positioned to create a different spot sizes in said first and second harmonic generators, said spot size selected to optimize overall conversion. The laser has at least two high reflector mirrors defining a resonator cavity at a fundamental wavelength; a first gain medium positioned in the resonator cavity, producing radiation at said fundamental wavelength; a first diode pump supplying pump beam of up to a maximum power at a pump wavelength to the gain medium; a Q-switch for pulsing the laser up to a maximum repetition rate; at first harmonic wavelength generator situated within said resonant cavity and optically coupled to it through at least one high reflecting coated optic; at second harmonic wavelength generator situated within said resonant cavity and optically coupled to it through at least one high reflecting coated optic; and means for outcoupling the desired harmonic wavelength without damage to optical components within said cavity.

In yet another embodiment of the present invention, a diode pumped intracavity converted laser is provided wherein at least one angled dichroically coated optic positioned to deflect a selected harmonic wavelength out of said resonator cavity, without damage to optical components within said cavity. The laser has at least two mirrors defining a resonator cavity at a fundamental wavelength; a first gain medium positioned in the resonator cavity, producing radiation at said fundamental wavelength; a first diode pump supplying pump beam of up to a maximum power at a pump wavelength to the gain medium; a Q-switch for pulsing the laser up to a maximum repetition rate; and at least one harmonic wavelength generator situated within said resonant cavity and optically coupled to it through at least one dichroically coated optic, wherein the fundamental beam diameter in first harmonic wavelength generator is smaller than 0.7 mm. The present embodiment may operate without detuning, without a thermal lens, or without $TEM_{00}$ operation.

In a further embodiment of the present invention, a diode pumped intracavity converted laser is provided wherein the power output of the frequency tripled wavelength is achieved with an efficiency greater than about 17% relative to the pump power absorbed in the gain medium. The laser has at least two high reflector mirrors defining a resonator cavity at a fundamental wavelength; a first gain medium positioned in the resonator cavity, producing radiation at said fundamental wavelength; a first diode pump supplying pump beam of up to a maximum power at a pump wavelength to the gain medium; a Q-switch for pulsing the laser up to a maximum repetition rate; a first harmonic wavelength generator situated within said resonant cavity and optically coupled to it through at least one high reflecting coated optic; a second harmonic wavelength generator situated within said resonant cavity and optically coupled to it through at least one high reflecting coated optic; and means for outcoupling the desired harmonic wavelength without damage to optical components within said cavity.

In a still further embodiment of the present invention, a diode pumped intracavity laser is provided wherein at least one angled dichroically coated optic is positioned to deflect a selected harmonic wavelength out of a resonator cavity, without damage to optical components within the cavity and wherein the fundamental beam diameter in first harmonic wavelength generator is smaller than 0.7 mm. The laser has at least two mirrors defining a resonator cavity at a fundamental wavelength; a first gain medium positioned in the resonator cavity, producing radiation at said fundamental wavelength; a first diode pump supplying pump beam of up to a maximum power or density at a pump wavelength to the gain medium; a Q-switch for pulsing the laser up to a maximum repetition rate; and at least one harmonic wavelength generator situated within said resonant cavity and optically coupled to it through at least one dichroically coated optic.

In a yet further embodiment of the present invention, a diode pumped intracavity laser is provided having at least two high reflector mirrors defining a resonator cavity at a fundamental wavelength; a first gain medium positioned in the resonator cavity, producing radiation at said fundamental wavelength; a first diode pump supplying pump beam of up to a maximum power at a pump wavelength to the gain medium; a Q-switch for pulsing the laser up to a maximum repetition rate; at least one harmonic wavelength generator situated within said resonant cavity and optically coupled to it through at least one dichroically coated optic; and a combination of a dispersive surface and a dichroic optic positioned to deflect a selected harmonic wavelength out of said resonator cavity, without producing damaging leakage to said gain medium or optical components within said cavity.

In another aspect of the present invention, a method is provided for an intracavity harmonically converted laser platform with at least two harmonic wavelengths and a means for selecting and using each. The method includes pumping a gain medium situated within a resonator cavity defined by at least two high reflector mirrors to provide a fundamental laser emission; pulsing the laser using an internal Q-switch up to a maximum repetition rate; frequency converting said emission within the optical cavity in a first nonlinear material to generate a first converted beam; reflecting said first converted beam from one of the high reflector mirrors, frequency converting said emission to generate a second converted beam that co-propagates in the second direction together with said reflected first converted beam to provide a combined frequency-converted beam; and using an outcoupler positioned to direct a selected harmonic wavelength of the combined frequency converted beam out of said resonator cavity. The method may further include means to prevent damage to optical components within said cavity due to leakage of said harmonic wavelengths.

A further understanding of the nature and advantages of the present invention will become apparent by reference to the remaining portions of the specification and drawings.

DETAILED DESCRIPTION

The present invention is directed at devices, systems, and methods for providing a diode end-pumped solid state laser which produces improved power output, long term stability and improved conversion efficiency from the pumping power.

Figure 1:
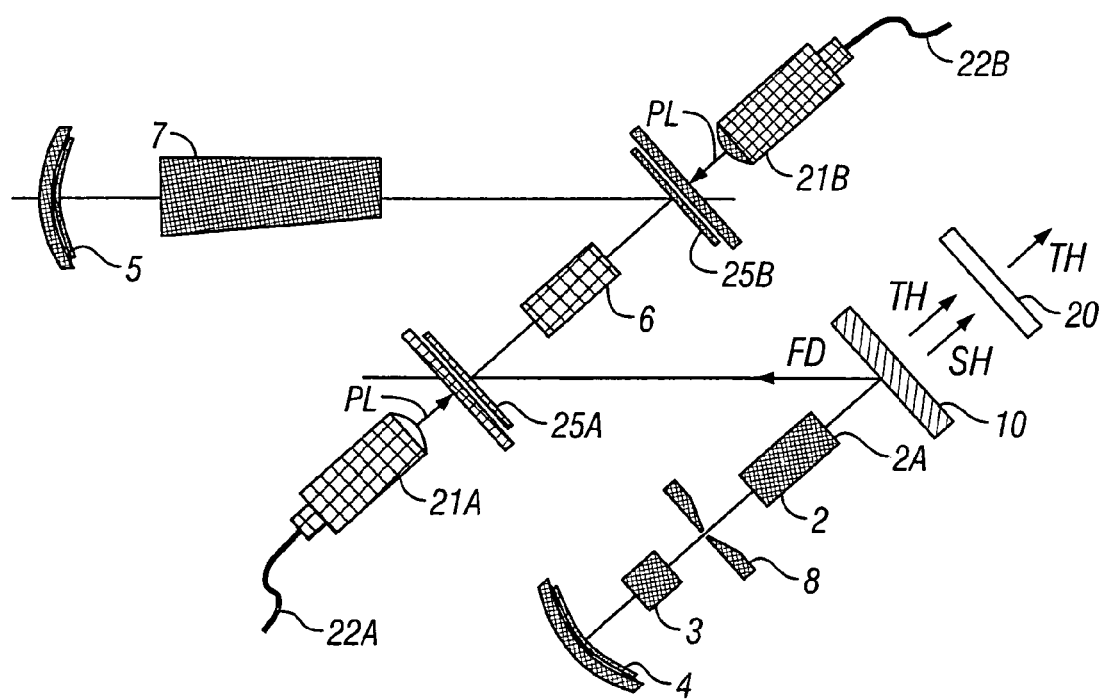
FIG. 1 is a diagram schematically illustrating the basic components of an intracavity UV laser architecture in accordance with the present invention.

Referring now to the embodiment in FIG. 1, a diode end-pumped solid state laser 1 is shown with intracavity third harmonic conversion in accordance with principles of the present invention. The laser 1 includes a gain medium 6 generating a fundamental beam, two nonlinear crystals shown as 2 and 3 and a Q-switch 7, all contained within a single resonant cavity defined by mirrors 4 and 5 which may be coated for high reflection at the fundamental beam wavelength. In this embodiment, the two crystals are positioned in line with slight offset provided by a small wedge on the exit face 2A of the crystal 2 to prevent undesirable leakage of the converted beam back towards the laser medium. An optional aperture 8 may further be inserted between the doubler and tripler crystals to truncate the harmonic beams and to prevent damage due to back reflections. Other optical elements known in the art of laser cavity design such as, but not limited to, apertures, waveplates, lenses, etc., may be included in the laser resonator 1 but are not shown in FIG. 1 for clarity of illustration.

The gain medium 6 may comprise a laser crystal pumped by radiation from diodes or diode laser arrays. Gain media may comprise but are not limited to the Nd-doped materials such as $YvO_4$ (vanadate), YAG and/or YLF. Other gain materials that may benefit from the present invention will be discussed elsewhere in the description. For the purposes of this illustration, the gain medium 6 is shown as end-pumped from two sides through mirrors 25A and 25B which may be coated for high transmission at the pump wavelength and high reflection at the fundamental beam wavelength. In other embodiments, the gain medium 6 may be pumped only through one side or it may be pumped transversely to the optical axis or by any other means generally known in the art of diode pumping. For the end-pumped configuration shown in FIG. 1, the pump radiation is preferably delivered through telescopes 21A and 21B, which may be used to collimate and image radiation from the diodes onto the ends of the laser medium rod 6.

For high power operation, it is desirable in some embodiments to couple the diode radiation through optical fiber, indicated schematically in FIG. 1 as 22A and 22B, as that allows locating the pump diodes and their cooling structures away from the laser cavity, thereby decoupling the laser head from any heat generated by the high power semiconductor laser sources. This allows for construction of more compact, passively cooled laser system, with excellent optomechanical stability properties. Such fiber-coupled end-pumped lasers have been successfully commercialized in the past decade and lasers producing over 30 W in $TEM_{00}$ mode are now readily available. For example, commercial product YHP-40 from Spectra-Physics Inc. of Mountain View, Calif. provides over 20 W at repetition rates varying from 5 to over 100 kHz based on $Nd:YVO_4$ gain medium. The power from this type of laser is generally scalable by the length of the gain medium and the available pump power up to a maximum determined by thermal stability considerations, as will be described further below.

In one embodiment of the laser system in FIG. 1, light generated by the active gain medium 6 traverses the tripler crystal 2 and is incident upon doubler crystal 3 which is configured to phase match for second harmonic generation (SHG). No conversion occurs upon first passage of the fundamental through the tripler 3 because it is oriented only for third harmonic generation (THG) in the presence of a second harmonic. Both fundamental and second harmonic light generated in crystal 3 are reflected from mirror 4 and additional second harmonic light is generated by SHG crystal 3 upon second passage of the unconverted portion of the fundamental. Both fundamental and second harmonic may be incident upon the tripler crystal 2 whereupon a third harmonic beam is generated by way of sum frequency mixing. The beam section between the exit face 2A of the tripler crystal 2 and the separator element 10 comprises the third harmonic, any unconverted portion of the second harmonic and fundamental. Indicated in FIG. 1 is a generic element 10, the function of which is to separate the different wavelengths, and out-couple the second and third harmonic beams (designated SH and TH, respectively) while reflecting the fundamental beam (designated FD) back towards the gain medium for further amplification. Upon exit from functional element 10, the second and third harmonic beams may already be spatially or spectrally separated, or they may be optionally directed to additional separation means 20 that are located external to the laser cavity 1. This may be a dichroically coated mirror or a dispersive element. Preferred embodiments for the functional separation means 10 which form part of the inventive subject matter of this application and are described further below following FIGS. 10A, 10B, and 11. Generally, the manner of said separation, i.e., whether both green and UV beams are available for use, or the green is dumped, leaving only the UV as the output of the laser, will depend upon the application needs.

Figure 2:
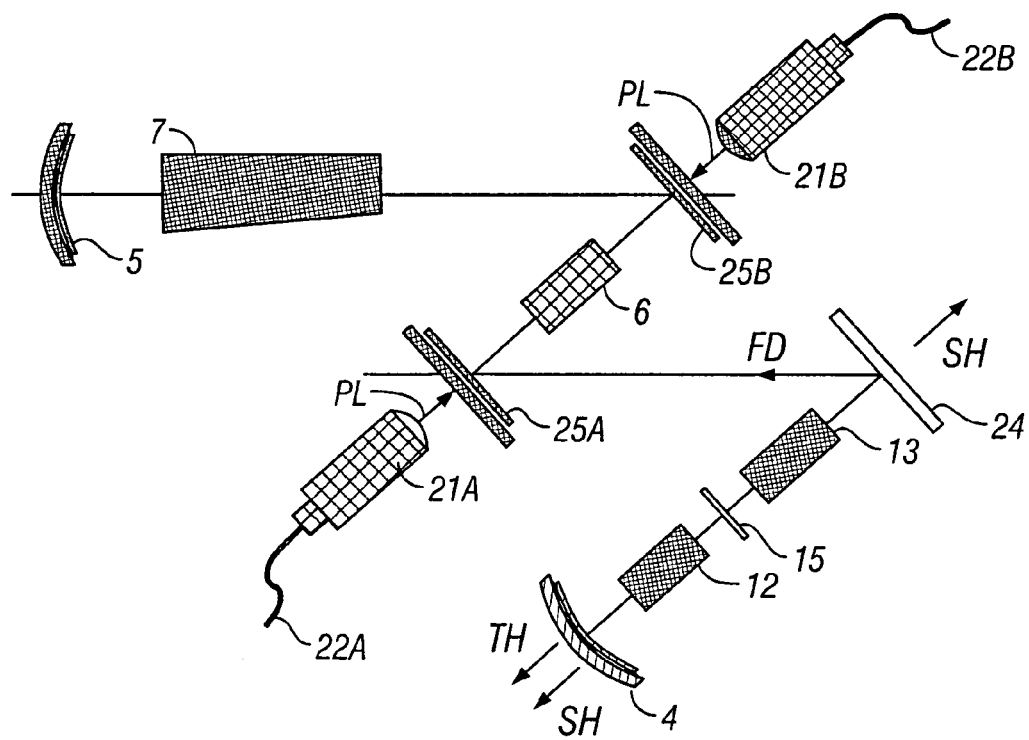
FIG. 2 is an alternative embodiment of an intracavity tripled laser cavity configuration.

Referring now to FIG. 2, alternative placements of the second and third harmonic crystals are feasible in other embodiments of the present invention. For example, there is shown in FIG. 2 a further embodiment wherein the positions of the doubler 13 and the tripler 12 are interchanged relative to their positions as shown in FIG. 1. This design results in sum frequency mixing (SFM) of the second harmonic beam generated following a single pass through the doubler 13 with the remaining fundamental beam in tripler 12. Both the output third harmonic and residual second harmonic beams now travel away from the laser gain medium 6, towards beam separator element 11 positioned and functionally adapted to provide high reflection of the fundamental while out-coupling the harmonics, i.e., the beam separator 11 fulfilling generally the same function as generic element 10 shown in FIG. 1. In this other embodiment, an additional beam separation element 24 still has to be provided between the nonlinear SHG crystal and the gain medium, in order to suppress any feed-through of residual second harmonic from traversing the laser material. Passage of any beam other than the fundamental through the active medium 6 is generally considered undesirable as it may be absorbed, cause damage to the AR coatings or generally interfering with the stable operation of the laser. It is noted that compared to the preferred embodiment of FIG. 1, the further embodiment of FIG. 2 has the advantage that the generated UV beam, which has the most potential to damage an active medium or coatings in intervening elements, is immediately directed away from the cavity as is the residual second harmonic. Therefore, even if there is some residual reflection of the green beam from some optic contained within element 11, additional conversion in the tripler 12 on the return path of the fundamental is expected to be negligible and any generated incidental UV light can be simply suppressed by inserting a standard UV filter 15 in the beams' path, for example between the two crystals. Further truncation of the UV and green beams to mitigate against back reflections may be provided by appropriate apertures, not shown in FIG. 2, but generally considered a straight forward part of the design of a harmonically converted laser.

Figure 3:
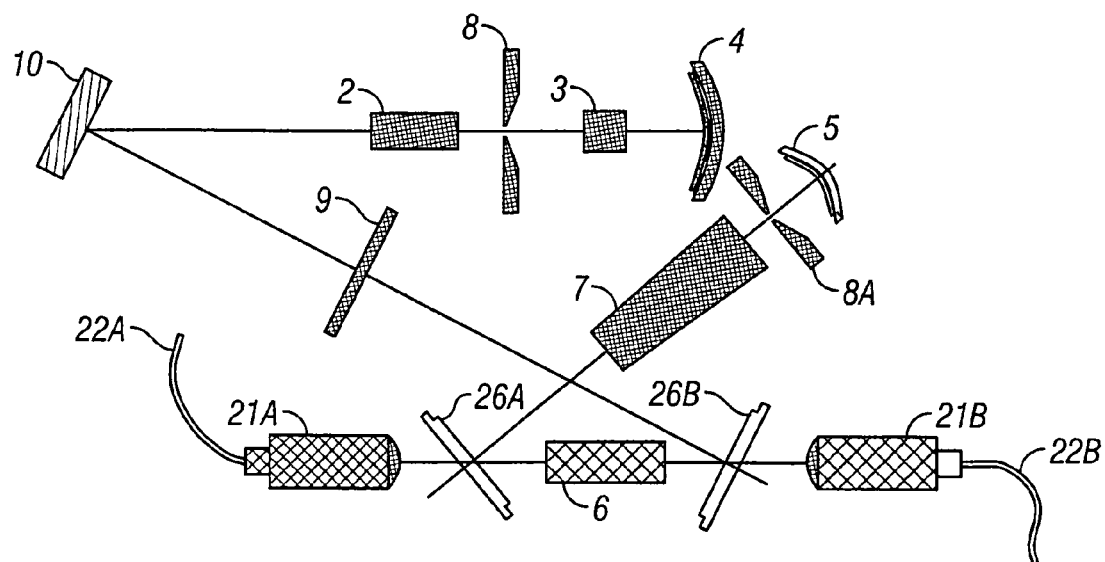
FIG. 3 is an alternative "X" geometry for an intracavity converted laser.

It will be appreciated that the multi-port folded "Z" geometry indicated in FIGS. 1 and 2 is but one of several options that may be selected for the laser cavity. Other configurations include but are not limited to "X", "V" or W geometries. As an example, there is shown in FIG. 3 a two-port folded X geometry which generally offers a smaller footprint from the view point of component layout than a corresponding "Z" cavity and may, in some cases, offer better working distance for certain techniques used for UV beam extraction. Such techniques are again, indicated generically, by functional means 10, which may comprise a single optical element, a composite or a set of optics, as will be further elaborated below. FIG. 3 is seen to comprise generally the same elements shown in FIG. 1. A half-wave plate 9 may also be used in combination with the intracavity tripling scheme for the purpose of rotating the polarization into the preferred plane. In addition to previous elements shown in FIG. 1, another aperture 8A may be inserted in front of the gain medium to clip the beam edges in case of any undesirable back-reflection. As shown in FIG. 3, mirrors 26A and 26B are set at an angle such that the fundamental beam path are folded over itself in an "X" pattern. Both pump mirrors may be coated-in the standard manner to transmit the pump beam wavelength and reflect the fundamental.

Figure 4:
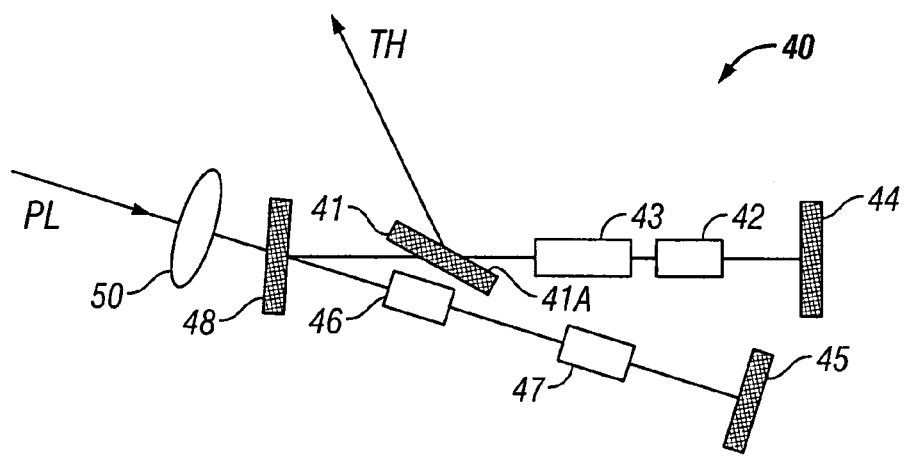
FIG. 4 is a schematic view of an intracavity converted laser with "V" geometry.

Referring now to FIG. 4, the simplest embodiment for a laser cavity including intracavity harmonic conversion may utilize a single-port "V" geometry. Such a configuration may be suitable geometry for lower power laser, generally with output UV power below about 5 W. In this particular embodiment, a doubler 42 and a tripler 43 are positioned along one section of a resonator 40 defined by two mirrors 44 and 45 that are coated for high reflection at the fundamental wavelength. A gain medium 46 is pumped from one side through mirror 48 that may be coated for high reflection at the fundamental wavelength and high transmission for the pump wavelength. Optionally, the pump mirror 48 may be coated for anti-reflection at the pump wavelength, which makes this optics simpler and less costly. The gain medium 46 along with an optional Q-switch 47 may be positioned in another section of the resonator which is off-set by some angle to the section containing the harmonic converters as well as an angled optics 41 used to extract the third harmonic wavelength. In a preferred embodiment, the separating optics 41 may comprise a dichroically coated tilted optics coated on side 41A for high reflection at the second and third harmonic wavelengths to thereby deflect the third harmonic out of the cavity while spatially separating it from the second harmonic beam. The beam separating optic 41 may also be AR coated on the same side for the fundamental beam wavelength which is therefore transmitted through pump optics 50 without experiencing any loss. Simplified pump optics 50 may be used here consistent with the a coupling scheme appropriate to the pump power used in this embodiment.

Other geometric configurations that may be used in conjunction with the intracavity conversion that is the subject of the invention include a "W", which may be compatible with two gain media within the same cavity. Generally the selection of the specific geometry for the laser cavity containing the intracavity converting elements depends on design factors specific to preferred performance requirements for a given application. Generally any pulsed diode pumped laser configuration containing at least one intracavity harmonic crystal falls within the scope of the present invention, subject only to the inventive limitations described herein.

The crystal 42 or other doubler crystal herein, may comprise but is not limited to, a Type I or Type II nonlinear crystal that may be phase matched for the wavelength of the fundamental beam. Many elements are known in the art for either critical or non-critical phase matching including, but not limited to, LBO, KTP, BBO, $LiNbO_3$ and $KNbO_3$. Examples of nonlinear crystals commonly used in the art of THG include Type II LBO, BBO, and CLBO and GdCOB among others. Generally, non-critical phase matching (NCPM) for tripling into the UV is more difficult to implement with standard crystals, requiring very high phase match temperatures or unavailable cuts. Also, various other structures may be used for SHG and THG such as but not limited to quasi-phase matched materials including periodically poled KTP and lithium tantalate. It is an interesting aspect that in quasi-phase matched materials the fundamental and higher harmonics can have identical polarizations. In a preferred embodiment of an intracavity converted radiation from a Nd: $YVO_4$ laser, critically phase matched (CPM) Type I LBO crystal and a Type II CPM LBO are used for the doubler and the tripler, respectively. In this embodiment, commonly available angle tuned Type I LBO may be advantageously used at or near room temperature, whereas the Type II tripler may be utilized near about 60° C. The SHG crystal may have broad-band AR coatings to reduce any Fresno losses. This combination of crystals is commonly known from extra-cavity conversion into the green and the UV for 1 micron lasers, where it has the advantage of providing walk-off compensation when appropriately configured. It is noted however, that unlike the external frequency conversion case, walk-off compensation may not be needed for an intra-cavity configuration where relatively large beam spot sizes (on the order of several hundred microns) are employed, because the loss in conversion efficiency due to walk-off represents only a small fraction of the beam spot sizes.

Thus, for the intracavity configuration, NCPM crystals can be advantageously employed instead of the CPM LBO for the doubler. For harmonics of 1064 nm, candidate crystals include but are not limited to Type I LBO Type II KTP. Both of these crystals have been successfully utilized in CWU systems containing intracavity SHG. For example, the 532 nm Millennia system from Spectra-Physics contains a Type I LBO, which can be temperature tuned to non-critically phase match near 155° C. with 145° C. to 175° C. as typical tuning range. Type II KTP may be used near room temperature and is used in several commercial high power systems for intracavity doubling. It is further noted that use of NCPM provides wider acceptance angle than the corresponding CPM scheme, minimizing walk-off and providing for rounder beams. Embodiments employing double pass through the doubler, such as the system of FIG. 1, may improve the efficiency of conversion into the third harmonic by improving the overlap between the two doubled beams, generated on each pass. As for the tripler, there are only a few crystals that may be oriented for NCPM for harmonic conversion into the UV. For example, GdCOB may be one such candidate for tripling into 355 nm and this crystal may become available in the near term commercially in the sizes and quality required For systems with fundamental wavelength, such as the 1.34 $\mu$m of Nd lasers, Type I LBO can be NCPM for THG into the blue spectral range at a phase matching temperature of about 150° C. In this case, NCPM tripling can be desirably combined with a NCPM LBO used for the second harmonic generation process, thus eliminating any need for walk-off compensation.

For practical and availability reasons, there are many cases where use of a CPM doubler is desirable. For example, there may be design environments where use of two or more crystals heated to different temperatures is undesirable from an overall mechanical design viewpoint or is not compatible with available crystal ovens. Or, a NCPM crystal with the appropriate cut for a given wavelength is not readily available commercially. If the walk-off turns out to be a substantial fraction of the beam spot size, as may occur for instance, when the laser beam is focused more tightly into the crystals, schemes for anticipating and compensating the effective walk-off of a doubler crystal may be optionally utilized. These may include use of an additional plate between the two crystals made, for example, of BBO or some other suitable material.

In operation, the efficiency and properties of the intracavity third harmonic generally depend on details of the SHG stage. Thus, it was found, surprisingly, that for a SHG system of FIG. 1, it is desirable in some embodiments to detune the amount of green conversion in order to optimize the UV. Thus, much of the known art, (see for example, U.S. Pat. Nos. 6,002,695 and 6,366,596) contains an implicit assumption that increasing the efficiency of the second harmonic conversion will lead to higher overall harmonic conversion into the desired third harmonic wavelength. This underlying assumption motivated for example, intracavity conversion schemes utilizing multi-passing the second harmonic as compared with single-pass or double-pass configurations, culminating in constructions (see for example the sub-resonant cavities described in U.S. Pat. Nos. 6,327,281 and 5,943,351).

The conventional expectations based on simple theory of harmonic conversion are often not borne out in practical implementations of intracavity converted lasers. It is believed that the requirement for detuning the second harmonic is a result of the dynamic energy balance scenario that prevail in an intracavity schemes with more than one harmonic crystal and the fact that the conversion is a self-limiting process as will be discussed below. The presence of beam shapes that differ from idealized flat top profile may provide further deviation from theoretical expectations. Following extensive experimentation, it has been determined that in the case of intracavity THG using LBO's, the highest UV output powers are obtained when the crystal length of the doubler is shorter by more than a factor of at least about 2 relative to that of the tripler. In one example, for an intracavity tripled Nd:vanadate laser, the optimal LBO crystal lengths were shown to be about 5 mm for the doubler versus about 15 mm or longer for the tripler, i.e., the ideal doubler length is a factor of about 3 shorter for optimal conversion. For this relative sizing, the efficiency of UV generation (relative to the input pump power) improved from about 12% to well over about 17% when a shorter doubler crystal was used, which translated to another 3 W UV for 56 W pump power input. The preferred relative sizing was schematically indicated in FIG. 1.

Improving on the harmonic conversion process is thus one of the inventive aspects of the structures disclosed in the present invention. It should be understood, of course, that there are various approaches to detuning the second harmonic from its peak. Shortening the effective crystal length is one preferred option that worked well in the cases investigated so far. Other options include but are not limited to: increasing the fundamental beam spot size, detuning the phase matching temperature from its optimum and using only a single pass second harmonic conversion, similar to what was shown in FIG. 2. It is recognized, however, that other options including, but not limited to, the alternate approaches listed above, as may be useful for different gain media, nonlinear crystals and cavity geometries, all fall within the scope of the present invention for different gain media. Based on preliminary estimates, it has also been determined that in schemes involving generation of higher order harmonics, such as where three or more nonlinear crystals are included in the cavity, detuning of one or more of the lower harmonics from their nominally optimal values will beneficially affect the overall conversion efficiency of the highest harmonic output. Intracavity conversion to higher harmonics, such as fourth, fifth, etc. with detuning of the lower harmonics, is therefore also included in the domain of the present invention.

In another embodiment of the present invention, one or more lenses are inserted in the laser cavity of FIG. 1 or 2 containing at least two harmonic crystals for generating a frequency tripled wavelength of the fundamental. It has been found that a configuration with fundamental spot sizes in the tripling crystal that are a factor of 2 or 3 smaller than those in the doubling crystal generate maximum output at the third harmonic wavelength. In one specific embodiment related to a Nd-doped vandate, a Type I LBO doubler and a Type II tripler, it was determined that fundamental beam spot size of about 600 microns in 20 mm long doubler and about 200 microns in a 25 mm long tripler would ideally provide the maximum conversion efficiency into the UV for a given pump power.

Regardless of the specific crystals, gain media or geometric configurations selected for performing the intracavity harmonic, it is desirable that the embodiments of the intracavity converted laser provide a substantially stable, low order $TEM_{00}$ mode output. In order to take advantage of higher power diode bars as pump sources, the issue of stability for single transverse mode operation should thus be addressed. In particular, in a cavity containing nonlinear elements, thermal lens and cavity stability considerations are strongly coupled with the harmonics performance and should therefore be taken into account from the onset. One driving limitation on the design of the intracavity converted laser is therefore set by the maximum thermal lens that may be tolerated for a given set of cavity design parameters.

For example, in the case of the strongly focusing $Nd:YVO_4$ the upper limit beyond which thermal effects degrade the output power and beam quality is known to occur at a pump light intensity of about 10 $kW/cm^2$. This sets a minimum spot size for a given pump power. On the other hand, there are trade-offs between the pump spot size and laser beam mode size that may be taken into account in optimizing the design for $TEM_{00}$ operation. This in turn sets limits on the spot sizes that may be utilized in the nonlinear crystals, thus affecting the overall harmonic conversion efficiency.

U.S. Pat. No. 5,410,559 to Nighan et al and U.S. Pat. No. 6,185,235 to Cheng et al, which are incorporated by reference herein, teaches that the relative sizing between the pump spot size and the fundamental laser mode are key considerations for a practical design of a $TEM_{00}$ laser. Depending on the thermal lens characteristics of the active material, the doping of the gain material is selected based on trade-offs between the maximum thermal lens that can be tolerated for the maximum pump power density, pump absorption properties and specific cavity design parameters required to provide the desired pulsed laser performance. In one example of interest to the present invention, reducing the resonator length, which may be desirable for obtaining shorter pulses also reduces the output power because the diameter of the $TEM_{00}$ mode scales with resonator length. Consequently, use of a shorter resonator produces higher pump intensities for the same pump power (i.e., the pump may be focused into a smaller spot)., thereby increasing the thermal lens, which in turn, will limit the overall $TEM_{00}$ intracavity power. Furthermore, shorter cavities limit the number of options available for extracting the harmonics, as will be discussed in more detail further below. Therefore, in a cavity containing nonlinear elements, thermal lens and cavity stability considerations are strongly coupled with the harmonics performance and should be taken into account from the onset.

Building on the above considerations, numerous experiments and modeling efforts were carried out to determine the optimal conditions for an intracavity converting laser. In particular for one embodiment of the present invention, it was found that pulsed laser cavities with thermal lens generally under about 12 D (diopters or $m^{-1}$) and preferably under about 10 D are best suited for intracavity conversion to the second harmonic or higher. This is true for lower power compact lasers or for the highest power lasers demonstrated to date. Lasers with larger thermal lens can be constructed, but they present stability issues which make them difficult to manufacture. Large thermal lens lasers often must include additional correcting optics and challenging design specifications which can make them less compatible with the intracavity conversion embodiments preferred herein. For example, for stability to be preserved across a range of repetition rates as is desired for many applications, it is preferred that thermal lens of the cavity should not appreciably change over the pump operating regime. When intracavity elements are inserted into the cavity, it is important to realize that these represent additional dynamic elements that are responsive to the pulse energy. They can therefore strongly affect the power balance of the fundamental beam, and careful design methodology may be employed in order to be able to operate with continuously varying pulse energies.

Figure 5A:
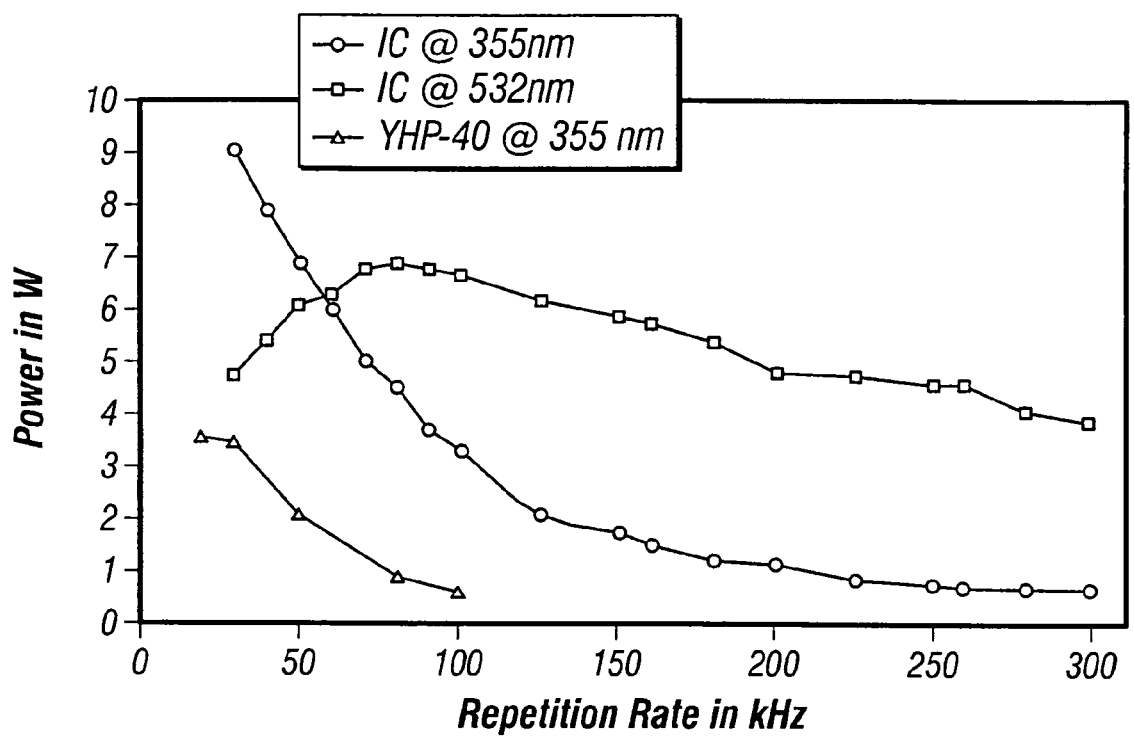
FIG. 5A shows experimental 355 nm power output results for an intracavity tripled laser and provides comparison to the performance of a similarly pumped laser using extra-cavity tripling.

More specifically, the intracavity conversion also functions as a dynamic output coupling element. Thus, higher conversion depletes more of the fundamental, which results in less circulating power. On the other hand, higher conversion means larger effective outcoupling, which effectively compensates for the reduced intracavity power. Ideally, the intracavity conversion is therefore a self-limiting effect—as the relative conversion to the harmonic changes, the thermal lens and the laser cavity mode readjust, altering the beam diameter in the harmonic crystal, and reproducing the original conversion efficiency. This stabilizing effect is manifest when the pump power changes, and is responsible for the stability of the harmonic output, an effect that was experimentally observed and noted before. Thus, in order to benefit from this self-limiting effect, the laser must be designed with thermal lens properties that allow the beam diameter in the harmonic crystals to decrease predictably as the pump power increases. Thus, since the thermal lens depends on the conversion efficiency, and the conversion efficiency is, in turn, inversely proportional to the fundamental beam size in the nonlinear crystal, the two effects counter each other, leading to stabilization of the beam parameter, including the output power for the intracavity converted laser. If however, the thermal lens of the cavity is so high that the laser operates at the edge of the stability curve, the dynamic intracavity conversion process may not be able to compensate fast enough for the any attendant power fluctuations, and the stabilization process breaks-down, to the detriment of the output stability. Run-away thermal effects can also become progressively detrimental to the laser performance at higher powers, where thermal lens and stress aberrations are already the limiting factors on the laser. Assuring that the thermal lensing characteristics of the fundamental laser do not compromise the operation of the intracavity laser represents therefore an important design consideration for intracavity converting devices, especially for higher powers, a crucial aspect that was not well appreciated by any of the known art known in this field FIG. 5A provides an example of the performance obtained for an intracavity frequency tripled $Nd:YVO_4$ laser constructed according to the principles of the present invention. The gain medium was pumped from two sides with nearly collimated 808 pump beam. The incident pump power was about 28 W on each side of which over about 95% are absorbed in the laser crystal, which generally has low doping using principles as was described in U.S. Pat. No. 6,185,235 to Cheng et al, incorporated by reference herein. The pump spot size was approximately 1.11 mm, with a laser mode of about 75–80% of that. This ratio of the $TEM_{00}$ mode size in the gain medium to the pump diameter and is known to provide optimal conditions for operation with a single transverse mode. See for example commonly assigned U.S. Pat. No. 5,410,559 to Nighan et al. and continuations-in-part thereof that are all hereby incorporated by reference. For the example described herein, the cavity mode is nearly filled inside the laser crystal, leading to a highly efficient construction of a $TEM_{00}$ laser. Without any lenses in the cavity, the fundamental laser beam size is slowly varying function of the propagation distance with only the thermal lens providing smallest beam size near the high reflecting mirrors. Beam sizes at the position of the harmonic crystals were on the order of about 550–600 $\mu$m. For this laser, a construction similar to that depicted in FIG. 1 was used with a prism providing the beam separation and output coupling, resulting in a cavity length of about 63 cm. The method using a single prism is known in the art of harmonic beam separation and is but one of several possibilities for extracting a UV beam from the cavity, and is not necessarily optimal, as is discussed further below in this description, where preferred approaches for beam separation are presented. The specific manner of beam extraction is not, however, expected to affect the results as presented in FIG. 5A. A standard acousto-optic (AO) Q-switch was used to pulse the laser at frequencies that could be varied from about 1 kHz to over about 200 kHz. The harmonic conversion was performed using a 3×5×5 mm long Type I LBO for the doubler and a 3×5×15 mm long Type II LBO for the tripler, both oriented for CPM. With these parameters, over 9.1 W 355 nm output was obtained at 30 kHz repetition rate, as shown in FIG. 5A—an efficiency of nearly 20% relative to the absorbed pump power. For comparison also shown in FIG. 5A are results using external frequency conversion based, generally on similar gain medium parameters, pump power characteristics and LBO crystals, with the exception that the doubler in the external conversion scheme is 15 mm long, same as the tripler. As the figure shows, the internal conversion outperforms external conversion by more than a factor of about 2 at the peak of conversion. Furthermore, the regime of operation for intracavity conversion can be extended into higher repetition rates with excellent pulse stability characteristics.

In experiments that lead to these results various LBO crystal lengths and different spot sizes were used to establish optimal operating conditions. As was mentioned above, it was found that detuning the conversion into the green may be desirable to obtain the highest possible UV powers. In fact, with doubler and tripler crystals of similar length, only about half the UV power could be obtained, as compared to the results shown in FIG. 5A. Changing the spot size in the doubler by displacing the crystal, as a method to detune the conversion into the green may be an option in alternative cavities with fast varying beam diameters, but is not optimal in cavities where the fundamental beam is nearly collimated or slow varying. Other approaches to lowering the relative amount of green conversion, such as off-setting the crystal temperature from the peak PM values, are feasible as well, but may not always be practical or provide sufficient detuning. The discovery of the importance of substantially detuning the SHG efficiency by reducing the crystal length from values predicted by standard theory, is an important discovery, and one that was not clearly anticipated in any of the known art of which we were aware.

Figure 5B:
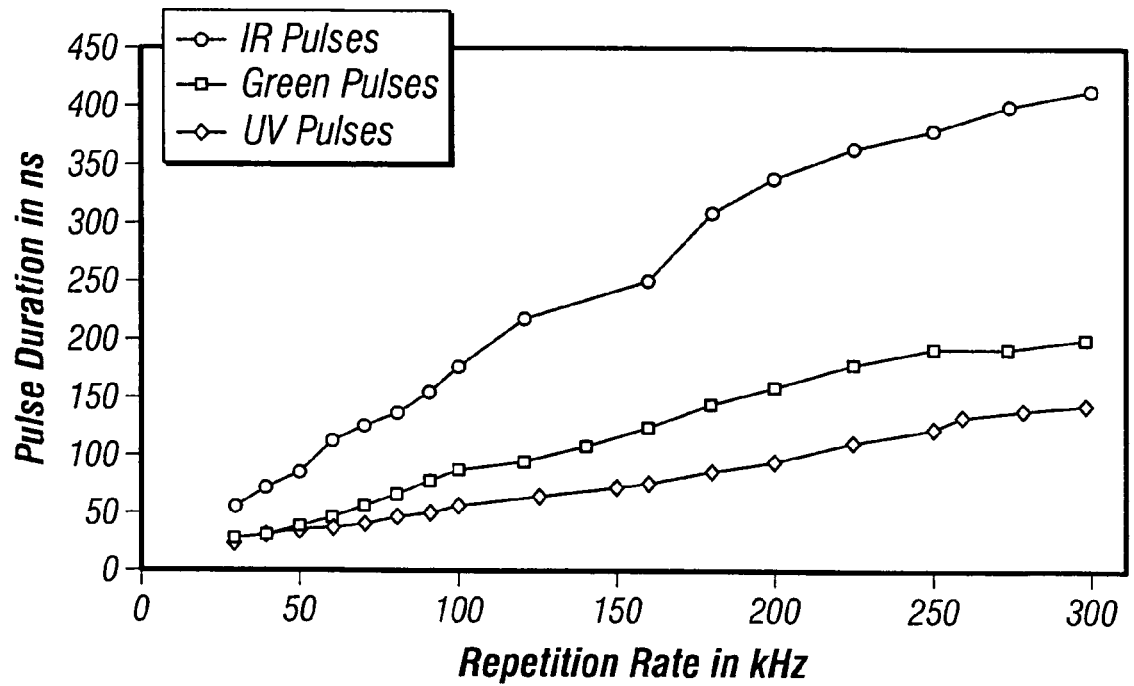
FIG. 5B shows pulse duration as a function of repetition rate for the intracavity tripled laser, by comparison with a similarly pumped laser using extra-cavity tripling.

FIG. 5B shows pulse duration as a function of repetition rate for the same cavity. As results indicate, pulse durations below about 50 ns could be obtained in the UV at repetition rates up to about 100 kHz and do not exceed about 100 ns even at about 200 kHz. By contrast with an extra-cavity converted laser, this represents a much smaller rate of increase of the pulse duration, an aspect that can be highly advantageous for applications requiring high repetition rate operation. This is again consistent with an intra-cavity conversion being a self-limiting effect, as was mentioned above. As expected, shortening the cavity resulted in lower pulse durations, especially at higher repetition frequencies.

For example, with a 50 cm long cavity, the UV output pulse duration was only about 40 ns long at 100 kHz increasing slowly to about 90 ns even at 250 kHz, while the power remained about the same as obtained with the original 63 cm long cavity.

It was also found that the quality of coatings used on the tripler, and especially for the sensitive exit face, is important. An improved AR coating made by an ion sputtering (IBS) process developed at Spectra-Physics, resulted in an increase of the power output from the same cavity to over 11.5 W—representing an efficiency improvement of nearly 25%. Still higher power could be obtained by increasing the available pump power. For example, scaling the input pump power to 64 W resulted in 12 W output, at 30 kHz in agreement with expectations.

This process cannot however continue indefinitely because of increase in thermal lensing, deteriorating stability and aberrated stress considerations, which affect both the power scaling potential and beam quality of the laser. Consequently, for Nd-doped materials such as vanadate or YAG, $TEM_{00}$ powers in excess of about 30 W per rod have been achieved only by limiting the pump power range over which the resonator is stable or by using multiple rods. The first option may be an undesirable limitation from an application viewpoint whereas the latter complicates the laser design, becoming increasingly more cumbersome and costly. Direct pumping into the upper level of the laser transition provides an another approach to achieve further power scaling without compromising the beam quality of the laser. The advantages of direct pumping have been pointed out before—see for example, Paper CTuI3 to Dudley et al presented in CLEO 2002 proceedings and titled "Direct 880 nm Diode pumping of Vanadate Lasers) In this paper, the advantages of using 880 nm pumping of Nd:YVO4, as compared with traditional 808 nm pumping were discussed, advantages that are attributable, in particular to about 40% decrease in the thermal lens. It was subsequently realized that desirably, an intracavity converted laser using directly pumped laser roads would provide a potentially straight forward approach to further scaling of the UV power in keeping with practical design principles limiting the thermal lens of the laser to realistic levels.

Figure 6:
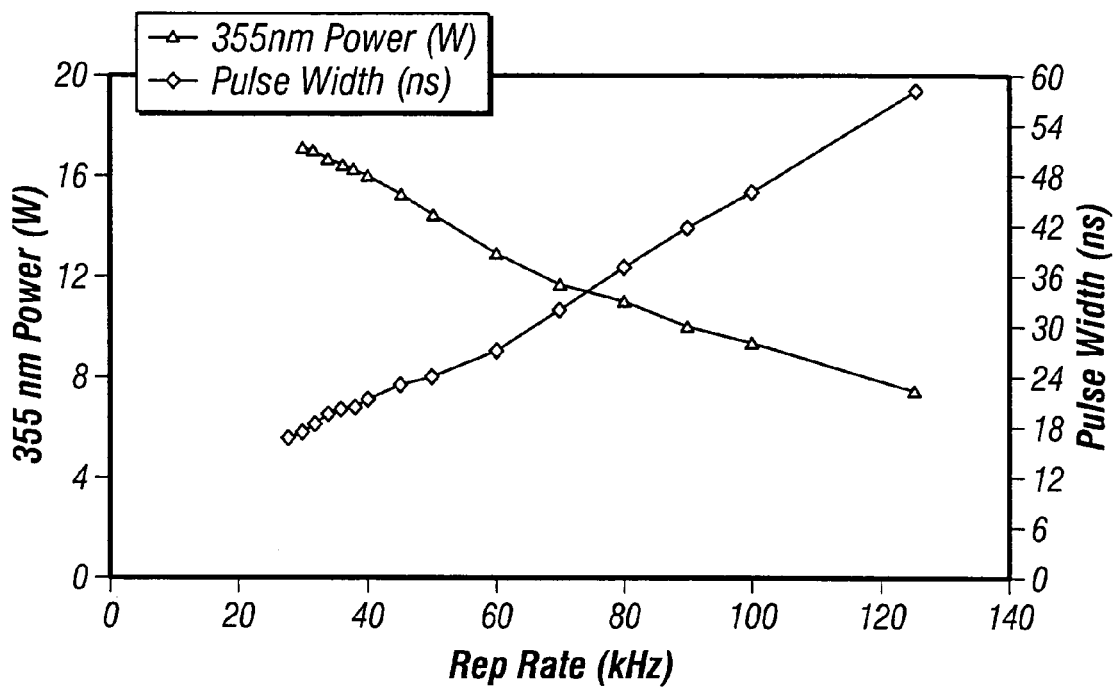
FIG. 6 is a graph of 355 nm power output and pulse duration for an intracavity tripled Nd:vanadate laser pumped at 880 nm.

An intracavity tripled laser cavity was thereupon constructed according to the principles of the invention and further adapted to pumping near 880 nm. One issue with this type of cavity is that considerations of laser crystal length and doping should be revisited because of lower absorption coefficients at this wavelength. The first intracavity demonstration was conducted using a 15 mm long Nd-doped vanadate crystal doped to about 0.5% The laser cavity was similar to the one used in connection with the experiments shown in FIG. 5A, with the same nonlinear LBO crystals and a single prism technique used to extract the UV output. The total absorbed pump power in this case was about 65%. FIG. 6 shows the results obtained for the 355 nm power and pulse duration as a function of repetition rate. As indicated, power outputs in excess of 17 W were obtained—representing the highest power from an intracavity tripled diode pumped laser known at the time of this disclosure. This translates again to a UV output efficiency of about 25% relative to the absorbed pump power. It is anticipated that with improved coatings designed specifically for this pump wavelength and additional optimization of the crystal length and doping concentration, it will be possible to obtain over 20 W of $TEM_{00}$ power from a compact, intracavity tripled Nd:vanadate laser with highly stable output and with pulses that may be as short as 10 ns at lower repetition rates.

Another key advantage attendant upon the intracavity conversion scheme involves improved lifetimes as a result of lower power densities. Recent life tests have already demonstrated over 500 hrs lifetime of the LBO crystals operating continuously at 10 W without degradation. This is significant improvement over the lifetime of tripler crystals used in extracavity modules which generally provide only a few hundred hours at most per spot at this output level. Various techniques involving crystal translation have to be implemented (see for example, co-pending Patent Application Serial No. PCT/US02/14851 to Gruber et al) to provide the >1000 hrs lifetime expected by customers. Such techniques and constructions add complexity and cost to the system. Therefore, an intracavity converted system with improved lifetime characteristics, especially in the UV, represents an important improvement in the state-of-the-art of high power, pulsed UV lasers.

Whereas high power lasers operating in UV harmonics are clear beneficiaries of the methods and principles of this invention, low power lasers and visible lasers can also benefit from application of selected inventive steps as laid forth in the present disclosure. For example, an intracavity frequency tripled laser using a compact configuration can be desirably adapted to replace the relatively inexpensive pulsed Nitrogen lasers. In one embodiment, a "V" configuration similar to the one shown in FIG. 4 is used to efficiently triple the wavelength of a Nd-doped gain medium such as but not limited to Nd:YLF, Nd:YAG or Nd:YVO4 to provide a highly compact, inexpensive, air-cooled UV laser with output power generally lower than about 2 W Generally, the $TEM_{00}$ mode size in these lower power lasers is smaller that about 700 $\mu$m and the cavity design can exploits the natural thermal lens and/or the curved cavity optics to provide spot sizes in the nonlinear crystals of about one half to one third of the fundamental mode size.

In other embodiments, a single curved optics such as a mirror, may be used to provide spot sizes in the crystals on the order of about 300–500 $\mu$m. Our analysis has indicated that with spot sizes in the harmonic crystals on the order of about 200–500 $\mu$m over about 10% efficiency of UV relative to the absorbed pump power can be achieved for the low power regime here. Correspondingly, it has been determined that with an intracavity harmonic conversion scheme, pump powers lower than about 10 W near 808 nm will therefore be sufficient to obtain the UV power output levels of 1–2 W in a $TEM_{00}$ mode with appropriately adapted cavity designs. Diodes with these power levels are readily available in commercial packages and may or may not need to be fiber coupled, depending on the application.

The advantages of intracavity conversion are clearly apparent here, as low power UV lasers based on external conversion would require overly tight focusing in the nonlinear crystals to achieve similar UV power output levels, potentially compromising their lifetime and adding to the overall cost and complexity of the system. In one example, Nd:YLF, which, with its long fluorescence lifetime is well suited for lower repetition rate lasers, was inserted in the "V" configuration of FIG. 4 to provide over 1 W of Q-switched 349 nm light at repetition rates ranging up to 5 kHz, using an AO modulator. Type I LBO was used for the doubler Type II LBO for the tripler, both AR coated. A coated tilted plate was sufficient to extract the UV in this low power case and the laser has operated with a high degree of stability without damage for over hundreds of hours. In other embodiments of the present invention, Nd-doped Vanadate may be used as the gain medium for applications requiring high repetition rates—generally above 10 kHz. Nd:YAG and Nd:YAlO3 are other examples of candidate Nd-doped doped media that may be implemented in the contemplated lasers. Q-switching may also be carried out with alternative modulators such as electro-optic (EO) Pockels' cell. A laser may also be gain switched for example, if it is pumped by another laser, as is the case, for example for Ti:sapphire.

Figure 7:
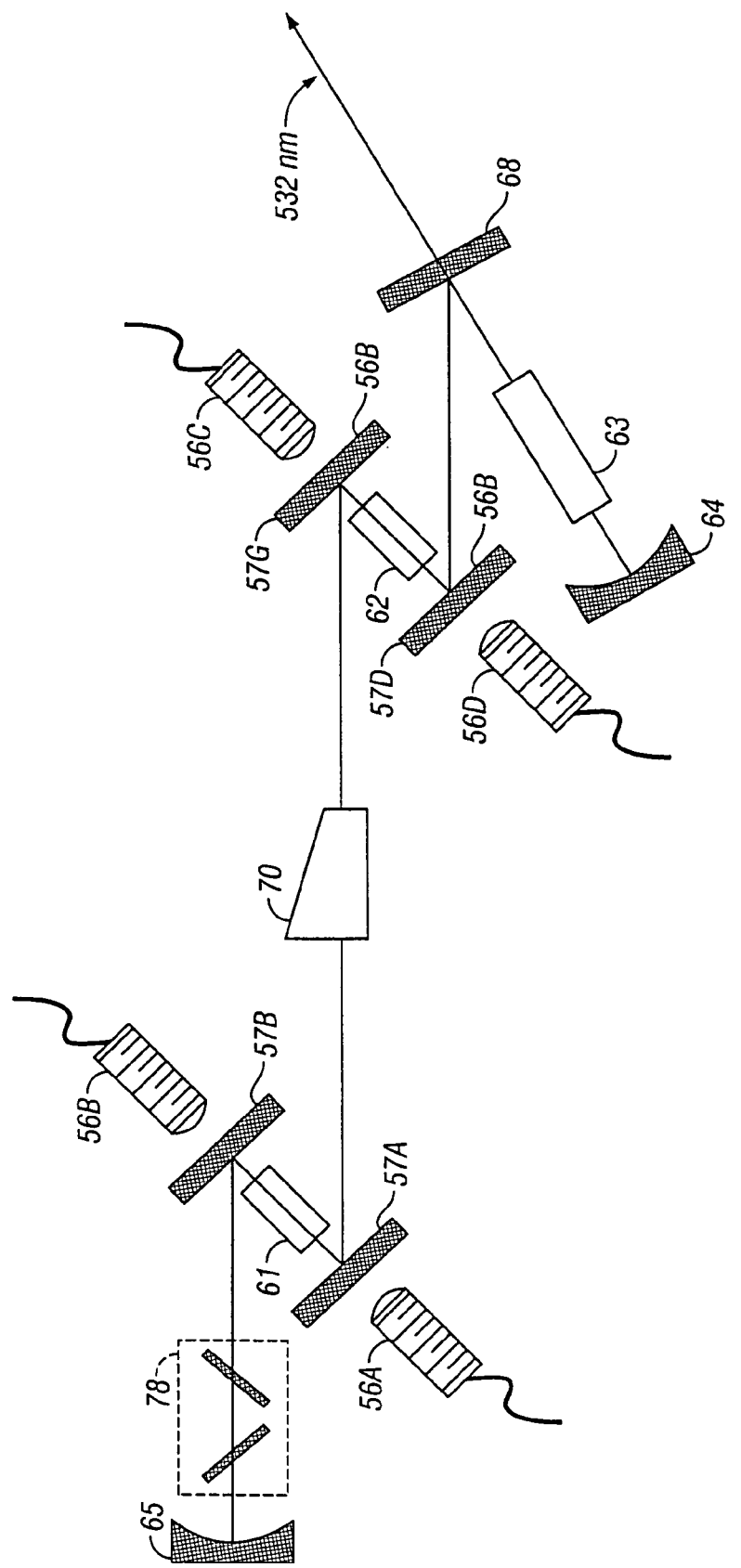
FIG. 7 shows a schematic resonator configuration for an intracavity green laser.

Referring now to FIG. 7, a still further embodiment of the present invention provides a highly efficient intracavity frequency doubled constructed by judiciously exploiting some of the principles described herein. As an example, FIG. 7 shows a high power version of a diode end-pumped laser cavity including two gain media 61 and 62, a Q-Switch 70 and a nonlinear crystal 63 adapted for doubling the fundamental radiation. The laser intracavity doubled configuration, which is adapted from a commercial "Inazuma" laser marketed by Spectra-Physics Lasers Inc. of Mountain View, Calif., utilizes a modified version of the basic "Z" configuration with a four-port pumping using fiber coupled diodes collimated and imaged with telescopes. Telescopes 56A and 56B couple pump radiation through respective pump mirrors 57A and 57B into gain medium 61. Similarly, telescopes 56C and 56D couple pump radiation through respective pump mirrors 57C and 57D into gain medium 62. The resonator is defined by resonator mirrors such as but not limited to high reflecting mirrors 64 and 65 and a dichroically coated optical element 68 used to extract the frequency doubled radiation. The curvatures of the mirrors 64 and 65, the pump spot diameter, the laser mode volume and the location of the nonlinear crystal are design features incorporating the salient features for highly stable $TEM_{00}$ operation according to the principles discussed earlier. In particular, as high $TEM_{00}$ mode stability is desirable for laser performance and overall reliability, the high gain laser is constructed with a thermal lens that are lower than about 10 D and may be less than about 6 D. This allows operation across a wide range of powers up to and including the maximum pump power, without undue fluctuations, power roll-overs and alignment difficulties. This is especially important when a frequency conversion process is taking place inside the cavity, which by its nature, depletes the intra-cavity fundamental power, thereby serving, essentially as an output coupler.

To avoid having to re-optimize the cavity at each repetition rate, a pair of tilted or angled Brewster plates 78 may be inserted in the cavity to provide a means of adjusting the relative power without having to resort to readjustment of the phase matching conditions on the nonlinear crystal as the repetition rate is varied. It is also generally advantageous to avoid overly tight focusing into the nonlinear crystal, preferably placing it at the natural waist of the cavity. In various modifications and variations of the laser resonator 100, the harmonic generator 63 may be single or double passed and different options for the element 68 may be used as are generally known from the art of frequency doubled lasers. Among other possibilities, the harmonic crystal 63 may be Brewster cut for deflecting the SH beam, thus alleviating the need for coated optic 68.

In a series of experiments conducted with the laser 100, total absorbed pump powers up to about 100 W were used to drive two $Nd:YVO_4$ crystals, which had concentrations and lengths selected to both optimize the absorption and keep the thermal lensing to manageable levels. Both CPM and NCPM LBO crystals were investigated with the CPM crystal, somewhat surprisingly, performing a little better.

Figure 8A:
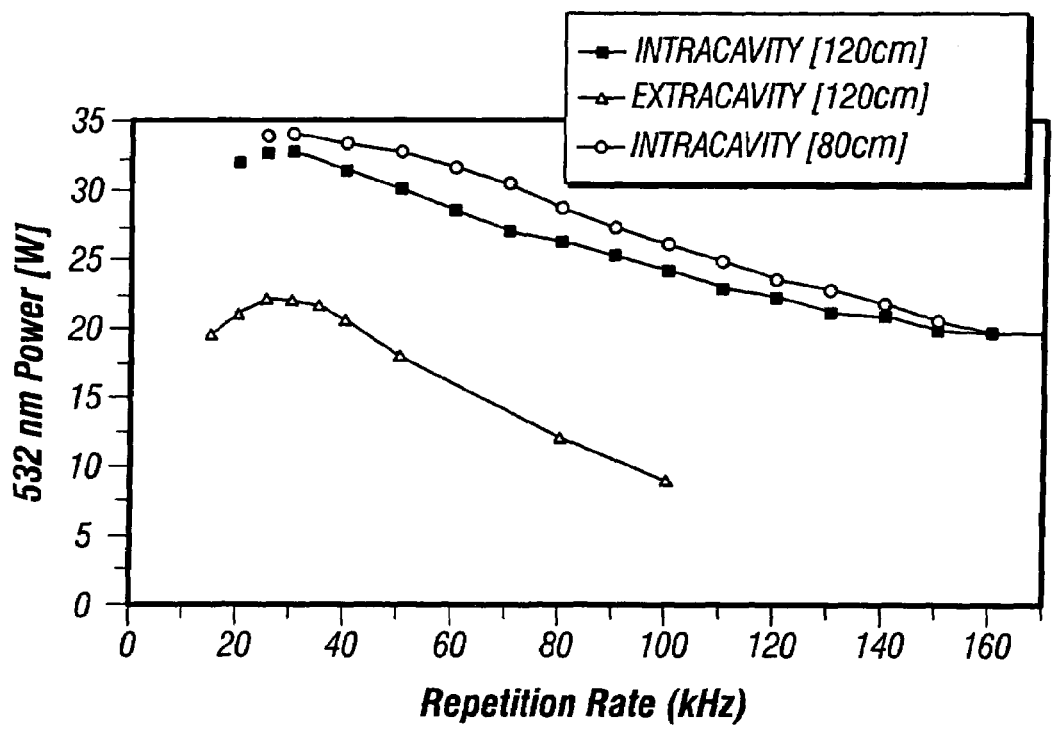
FIG. 8A shows the power output as a function of repetition rate for an intracavity generated green laser and provides comparison to an extracavity converted laser pumped with the same power.
Figure 8B:
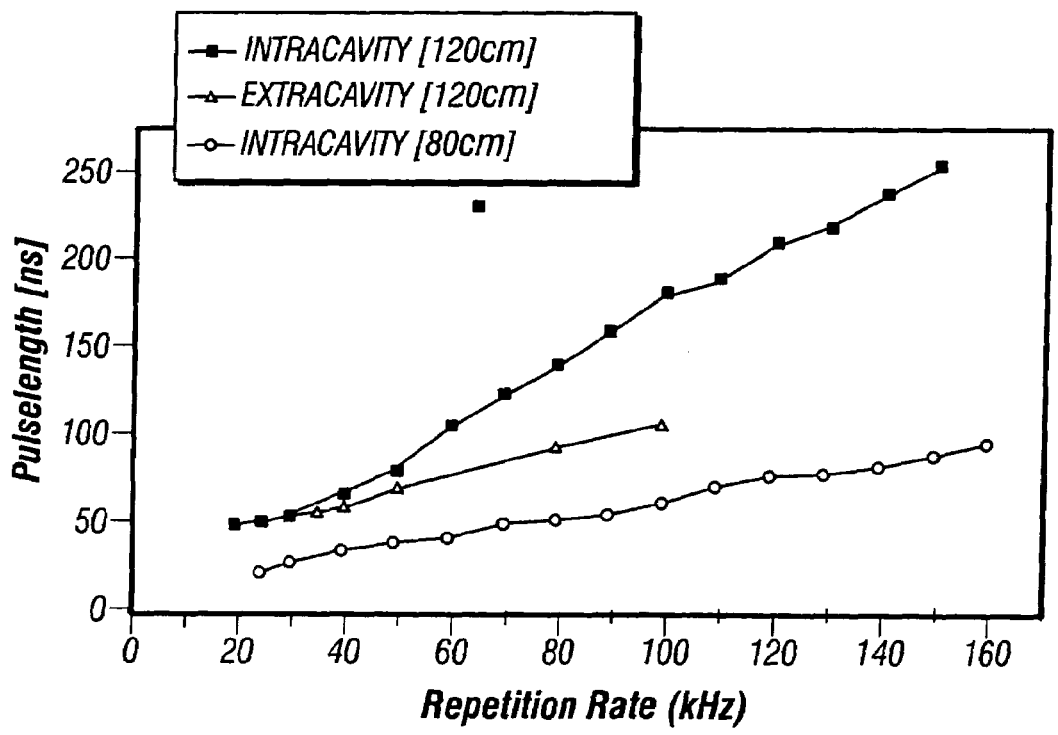
FIG. 8B shows the pulse duration for a green laser using intracavity and extracavity schemes.

FIGS. 8A and 8B show, respectively, the 532 nm output power and pulse durations obtained with the intracavity doubled laser as a function of repetition rate for two different lengths of the cavity, 80 cm and 120 cm. For comparison, results obtained with an external frequency doubling module of the standard Inazuma laser are also shown. Thus, as FIG. 8A shows, a nearly 35 W is obtained from the intracavity-doubled laser at 25 kHz as compared with just over 22 W for the corresponding externally doubled laser. Furthermore, the power decreases less sharply for the intracavity system with 20 W available even at 160 kHz. Notably, a laser constructed with the configuration of FIG. 7, without the doubler, provided between 36 and 4 W of fundamental power. Clearly, the intracavity doubled laser operates with very high efficiency, not attainable with an externally doubled configuration. The power outputs are also seen not to be appreciably different for the two cavity lengths investigated. This is a highly encouraging result since shorter cavity lengths are advantageous for situations where smaller pulse durations are needed. As indicated in FIG. 8B, the pulse durations for the 80 cm cavity are considerably shorter than those for the 120 cm long one, with 20 ns pulses at the minimum repetition frequency increasing to less than 100 ns pulses achievable even at repetition rates as high as 160 kHz. By contrast, the externally converted laser provides pulses longer than 50 ns and may generally exceed 100 ns at 100 kHz.

It is noted that as long as the design principles as put forth in this disclosure are observed, numerous other modifications and variations of intra-cavity converted lasers are feasible. In the case of the intracavity doubled laser, power scaling of up to 50 W in the green is feasible using direct pumping, as was described earlier. Of course, lower power, highly compact second harmonic lasers are also possible, using by way of example and not limitation, one gain medium and/or single-sided pumping. In other cases, different gain media may be advantageously used in the same cavity to counter the energy depletion of the central portion of the circulating fundamental beam, thereby achieving still higher conversion efficiencies for second or higher harmonics.

Furthermore, the same principles used for construction of intracavity converted lasers operating on the main fundamental wavelength, may be applied to obtain the harmonics of alternative emission lines. As an example of such an alternate application of the methods of the invention a 1.34 $\mu$m Nd:YVO4 laser was constructed and intracavity doubled to 0.67 $\mu$m with high efficiency using Type I LBO cooled to just under about 0 degrees C. The laser may also be intracavity frequency tripled to 0.445 $\mu$m using Type II LBO that is critically or non-critically phase matched. By inserting an additional set of appropriately coated mirrors in a cavity containing a Q-switched diode-pumped Nd-doped medium a laser can also be made to operate on two wavelengths and the consequent radiation sum frequency mixed inside the cavity. In the Nd:YVO4 example, mixing the 1.064 $\mu$m fundamental with the 1.34 $\mu$m would provide a converted beam in the yellow range that is of considerable interest to medical applications. Alternatively, the Nd:YVO4 could be operated on the three-level 0.914 $\mu$m transition, which can be intracavity mixed to provide blue radiation near 490 nm, thereby providing a potential replacement of Ar ion lasers that may be in certain applications.

Figure 9A:
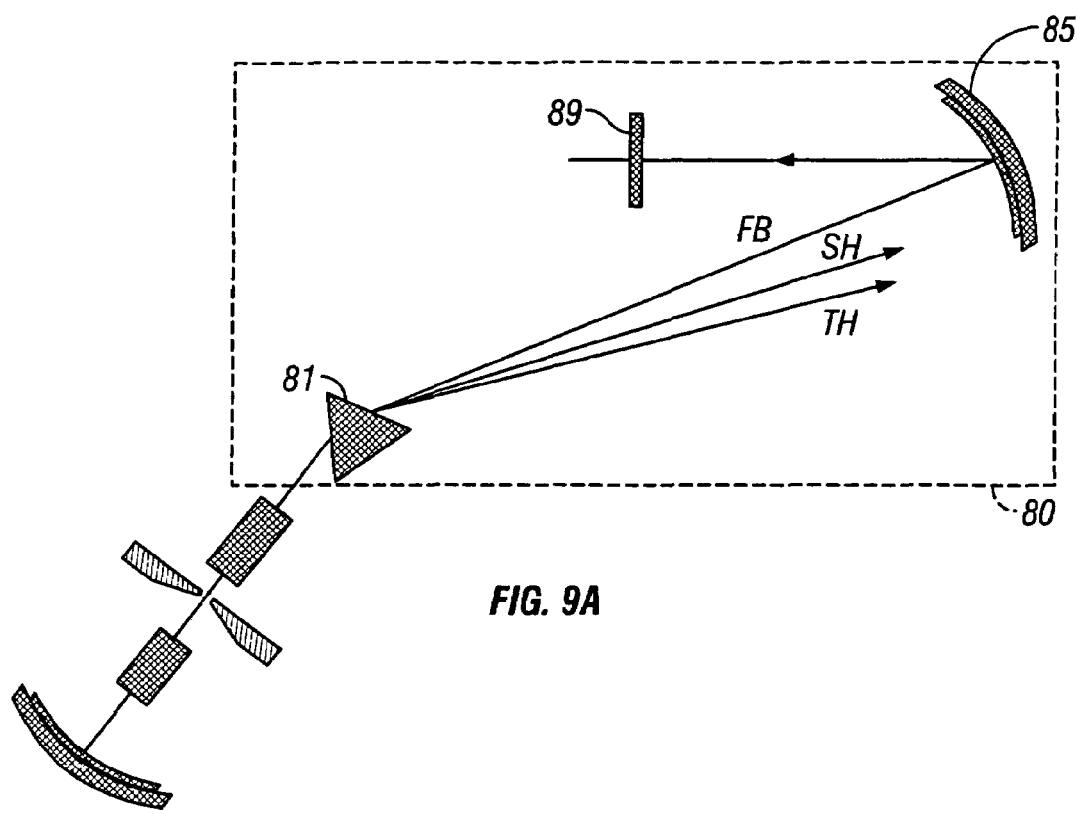
FIG. 9A shows a harmonic beam separation scheme using a prism.
Figure 9B:
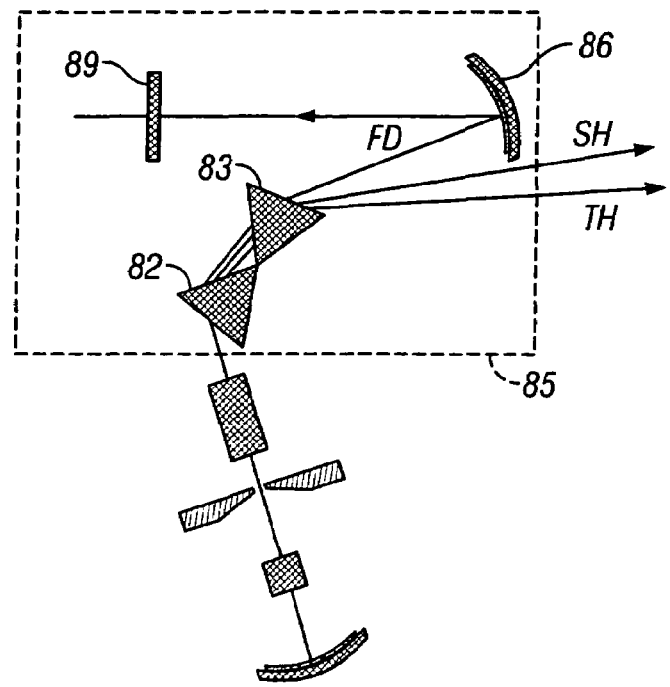
FIG. 9B shows a harmonic beam separation scheme using two prisms.

The one area of concern to intracavity converted lasers involved methods for extraction of the harmonic beam. Dispersive surfaces such as a prism can be used for extraction but it is recognized that such surfaces can give rise to resonators that are highly asymmetric and overly long, because of the need to provide enough dispersion. For example, there are shown in FIGS. 9A and 9B two techniques utilizing one or two prisms for extracting UV light from an intracavity tripled laser. The broken line box indicates that the group of optics including prisms, mirror and half-wave plate functionally represent element 10 as shown in FIG. 1 or element 11 in FIG. 2. In FIG. 9A a prism 81 is used to separate the two harmonic beams, indicated as SH (for second harmonic) and TH (for third harmonic) from the fundamental beam, designated FD. A curved mirror 95 is coated to reflect the fundamental and an optional half-wave plate 89 is inserted to rotate the polarization back into the horizontal plane. This is convenient for a pulsed laser system based on polarized Nd:YVO$_4$ but may not be necessary for other gain media. Third harmonic generation of the 1 micron radiation from Nd-doped host materials has been obtained in the known art as well as by us using such prism-based architectures. However, as mentioned above, it has found, for example, that use of the single prism configuration leads to highly asymmetric resonator configurations with a long "dog-leg". This results in alignment difficulties and also leads to cavities that were generally longer than was desired—for example, when shorter pulses are required. An alternative, using two prisms to extract the UV as shown by elements 82 and 83 in FIG. 9B can be used to construct shorter cavities, because of the larger angular separation provided by using additional dispersive surfaces. In experiments conducted with an intracavity tripled diode-pumped Nd:YVO4 laser, it has been found, for example, that using a two-prism extraction scheme allowed the resonator length to be shortened by more than 25%, as compared with a set-up using a single prism. The pulse duration of the UV output was correspondingly shortened, but not markedly so until the highest repetition rates, while the power output remained mostly unchanged. The key drawback of a system using a two-prism extraction scheme is that it is clearly more cumbersome and is also more difficult to align in practice.

Another useful UV extraction scheme may utilize a dispersive surface on the tripler crystal thus providing beam separation and voiding the need for AR coatings on this sensitive UV exit face, as was described, for example, in U.S. Pat. No. 5,850,407. While attractive from an overall optical simplicity viewpoint, our investigation of this approach concluded that it generally provides beams that are highly elliptical and must be circularized using additional optics. This defeats the objective of this invention, which sets the goal of thus overall design simplicity Furthermore, the design of a Brewster cut tripler is unique to a particular tripling application and does not provide the design flexibility explicitly stated as another of the objectives of the present disclosure. Many other extraction methods are known in the art of UV beam separation, but generally all possessed deficiencies with regard to one or more of the objectives set for the intracavity converted laser that is the subject of the invention.

Figure 10A:
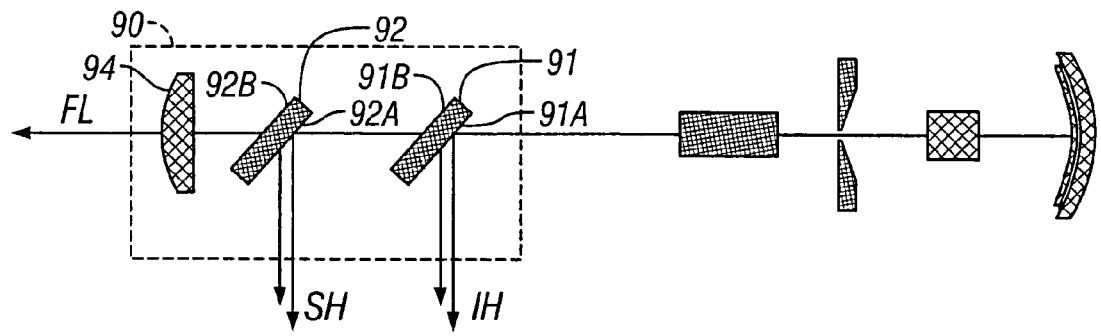
FIG. 10A shows a preferred embodiment of harmonic beam separation using two tilted dichroics.
Figure 10B:
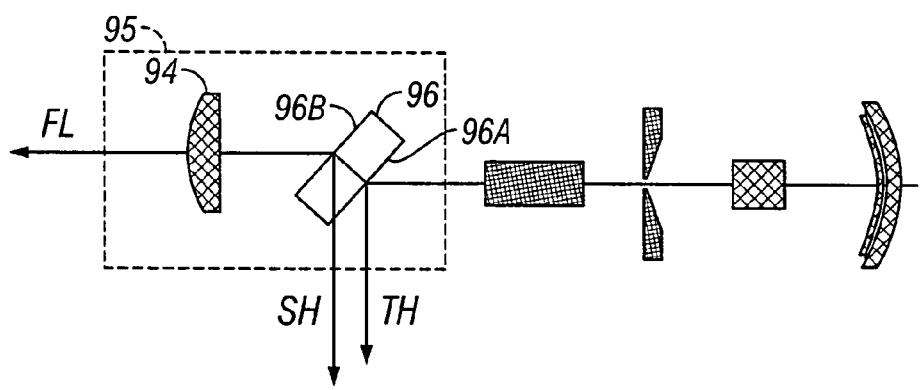
FIG. 10B shows a preferred embodiment of beam separation using a single tilted optic with different coatings on two sides.
Figure 11:
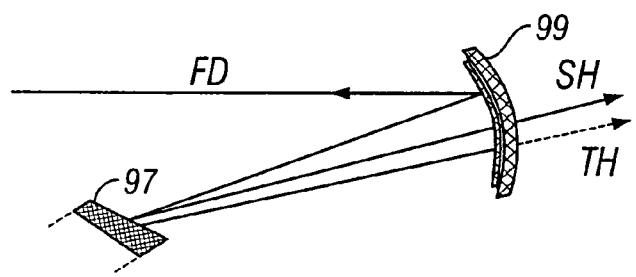
FIG. 11 shows a preferred embodiment of beam separation using a combination of a dispersive element and a trichroic coating.

Referring now to FIGS. 10A, 10B and 11, a number of novel approaches to beam extraction are hereby disclosed, each of which is selected to meet the unique design needs of the intracavity converted lasers disclosed herein. Generally, all the techniques meet certain desirable functional criteria, including damage resistance at all the incident wavelengths, maintaining beam circularity, compatibility with straight forward, more symmetrical cavity designs and manufacturability of the optics using known techniques. Wherever possible, it is further desired that means be included to suppress any undesirable feed-back of UV or green into the laser medium.

Referring now to FIGS. 10A and 10B, the techniques shown represent optical realizations of the functional element previously represented by numeral 10 and 11 in FIGS. 1 and 2, respectively. FIG. 10A shows an embodiment 90 for beam separation comprising two tilted dichroic plates 91 and 92. Tilted plate 91 is generally coated on side 91A for high reflection in the UV and high transmission at other wavelengths. Use of an angled plate makes the design of such dichroic coating generally easier than for a flat plate. Furthermore, the angle can be selected to also provide additional dispersion between the visible and UV beams so that a portion of the second harmonic (designated SH) is reflected from plate 91, generally off-set by some angle from the UV beam. A second tilted plate 92 is coated on side 92A for high reflection of the green and high transmission in the infrared. Again, the tilt on plate 92 deflects any remaining UV light away from the path of the fundamental beam, designated FL. The other surfaces of plates 91 and 92 (side 91B and 92B, respectively) are coated for broadband AR coated to prevent losses. In this manner, the UV and visible harmonics are extracted with high spectral purity, while preventing any leakage of the harmonic wavelengths from propagating towards the gain medium. The lens 94 shown in FIG. 10A is indicated as an alternative to a curved tilted mirror and is generally used to adjust the beam diameters in the harmonic crystals, consistent with required harmonic conversion characteristics. With this set-up, minimal astigmatism is imparted to the beams—generally a desired feature for a laser system.

An alternative embodiment 95 using dual dichroic coating is shown in FIG. 10 B, where a single tilted plate 96 is used with the feature that it has two different dichroic coatings on its two sides. Side 96 A is coated for high reflection at the UV wavelength and high transmission for the visible and infrared. Side 96 B is coated for high transmission in the infrared and high reflection in the visible. The plate's thickness and angle are chosen to provide sufficient separation between the UV and visible beams allowing extraction of the UV beam, again with high purity.

Note that both of the above embodiments use combination of tilted surface and dichroic coatings assures higher purity of the spectral content the desired harmonic than is possible with coatings alone, which are known to be imperfect.

Still another embodiment is shown in FIG. 11 which is designed to overcome the disadvantages of trichroically coated optics. As was mentioned above, the proximity of the 355 nm and 532 nm harmonic wavelengths makes it difficult to design a coating that is purely transmissive at both of these wavelengths, while being highly reflective at the fundamental. Residual absorption in any of these wavelengths causes small changes in the temperature which can offset transmission and reflection properties of the mirror at any of the other wavelengths, resulting in instabilities in the output. In particular, measurements on available trichroic mirrors indicated susceptibility to absorption in the infrared in the presence of a UV beam, an effect which would increase as the mirror got warmer. An approach that can overcome thermal effects is to use a dispersive element to separate the harmonic beams enough to prevent them from being incident on the same spot on the mirror. This can be achieved with the help of a single dispersive surface 97 inserted in the path of the combined beams prior to reaching the trichroic mirror 99. The angle of the dispersive surface 97 should be sufficient to allow sufficient separation between the three wavelengths, which is still small enough to be intercepted by the free aperture of mirror 99. In a preferred embodiment the dispersion is provided by fabricating a wedge on the exit surface of the tripler crystal, that is generally smaller than the Brewster angle. A small wedge is already built into the design of the harmonic crystal to prevent reflections, generally of 1–2 degrees. In this embodiment the wedge can be made larger—up to about 45 degrees. A secondary advantage of such a wedge is that AR coatings are easier to design for tilted surface, requiring fewer layers. Consequently, the exit face of the harmonic crystal used for generating UV—usually recognized as the most crucial surface in the system—is able to withstand high peak powers without damage for extended periods of time.

Variations on the basic beam extraction designs presented above are possible, using different combinations of wedged or tilted surface and coated optics, and generally fall under the scope of the invention. For example, tilted mirrors or a flat mirror/lens combination may be used interchangeably in any of the above embodiments. Other modifications using additional dichroic elements and/or dispersive surfaces can be implemented to provide beam extraction of higher harmonics. For example, an additional intracavity nonlinear crystal may be used to provide radiation at the fourth or fifth harmonic of an infrared laser, as is known in the art. Modified versions of the beam separation techniques shown in FIGS. 10A, 10B and 111 can then be constructed using state-of-the-art coatings to extract UV beams at or near 215 nm or 266 nm retaining the desired spectral purity and damage resistance features that inform key aspects of the present invention. It is important to note, that depending on the performance requirements imposed on the laser, all the three extraction methods presented above are compatible with resonator lengths that can be as short as spacings between components and required $TEM_{00}$ mode dimensions allow. Generally shorter pulse durations can therefore be achieved at harmonic wavelengths than was possible before.

Other issues that affect the performance of the intracavity laser are known. These include the gating performance of the infrared laser which affects the rise time of the harmonic module, thermal control of the nonlinear crystals, and special provisions required for handling environmentally sensitive media, such as CLBO.

The key issue that need to be considered for thermal regulation of the nonlinear crystals involves variations in the phase matching conditions as the incident power and repetition rates vary. This is an important considerations for crystals such as LBO which may rely on temperature-tuning for optimized conversion. Generally, it is not desirable to re-phase match each time the PRF changes as that complicates the operation of the intracavity converted laser. In particular, ovens such as thermoelectric coolers (TEC) are desirably constructed to allow sufficiently rapid response to heating and cooling cycles. By contrast resistive ovens work well when the differential between ambient and crystal operating temperature are high enough to prevent run-away due to self-heating.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention. Any of the features described in this application or any reference disclosed herein may be adapted for use with any embodiment of the present invention. For example, any geometric configuration shown or described in the specification may be combined with a doubler, a tripler, an extraction device, combinations of any two of these elements, combinations of any three of these elements, or combination of all of these elements. This may be applied any of the embodiments herein. For any embodiment herein, instead of maximum a first diode pump supplying pump beam of up to a maximum power, the pump beam may be up to a maximum density. For any embodiment herein, the Q-switch may be used for pulsing the laser, the laser output, or the like up to a maximum repetition rate. Although not optimal in higher power pulsed intracavity tripling laser, a trichroically coated mirror for UV may be used for the optical element denoted as 10 in FIG. 1. All patents or patent applications listed in this specification are fully incorporated herein by reference for all purpose. Some or all embodiments of the present invention may also incorporate features from elements described in the known art or in the background of the present disclosure. Expected variations or differences in the results are contemplated in accordance with the objects and practices of the present invention. It is intended, therefore, that the invention be defined by the scope of the claims which follow and that such claims be interpreted as broadly as is reasonable.

What is claimed is:

1. A diode pumped intracavity converting laser, comprising:
    at least two reflector mirrors defining a resonator cavity at a fundamental wavelength;
    a first Nd-doped gain medium positioned in the resonator cavity, producing radiation at said fundamental wavelength,
    a first diode pump supplying pump beam of up to a maximum power at a pump wavelength to the gain medium,
    at least one harmonic wavelength generator situated within said resonant cavity and optically coupled to it through at least one dichroically coated optic,
    an outcoupler extracting a desired harmonic wavelength without damage to optical components within said cavity;
    said resonator cavity and gain medium adapted to operate in a TEM00 mode with a thermal lens in the cavity that is less than 12 D at all pump power levels up to said maximum, such that the said fundamental beam diameter in the harmonic wavelength generator decreases as the pump power increases.

2. The laser according to claim 1 wherein said Nd-doped gain medium is selected from one of the following materials: vanadate, YAG, YAlO3 or YLF.

3. The laser according to claim 1 wherein harmonic output beam is circular.

4. The laser according to claim 1 wherein the pump wavelength is selected to provide direct excitation of the upper laser level of said gain medium.

5. The laser according to claim 1 wherein the harmonic wavelength generator comprises a non-linear crystal providing radiation at a second harmonic wavelength.

6. The laser according to claim 5 wherein the cavity includes a second nonlinear crystal producing a third harmonic wavelength.

7. The laser according to claim 6, wherein the fundamental beam diameter in the crystal is large enough to obviate the need for walkoff compensation.

8. The laser according to claim 6, further including means for walkoff compensation.

9. The laser according to claim 5, wherein the cavity includes a second and third crystal producing a fourth harmonic.

10. The laser according to claim 5, wherein the cavity includes a second and third crystal producing a fifth harmonic.

11. The laser according to claim 5 wherein the nonlinear crystal comprises material selected from one of the following: LBO, KTP, KNbO3, CLBO, BBO.

12. The laser according to claim 6 wherein the first crystal comprised Type I LBO and the second crystal is Type II LBO.

13. The laser according to claim 1 wherein the extraction means comprising multiply coated optics.

14. The laser according to claim 1 wherein the extraction means are provided comprising a combination of dispersive surface and a dichroic optic.

15. The laser according to claim 1 wherein the extraction means are provided comprising one or more tilted dichroic optics.

16. The laser according to claim 6 wherein the second harmonic is detuned from optimal conversion efficiency.

17. The laser according to claim 1 further including means for suppressing harmonic feed-back through the gain medium and associated cavity optics.

18. The laser according to claim 5 wherein the third harmonic is obtained with efficiency greater than 180% relative to the absorbed pump power.

19. The laser according to claim 6 wherein the second harmonic is obtained with efficiency greater than 25% relative to the absorbed pump power.

20. The laser according to claim 1 where the fundamental mode size in said gain medium is substantially smaller than about 1 mm.

21. The laser according to claim 6, where means are provided to utilize multiple harmonics.

22. A diode pumped intracavity tripled laser comprising:
at least two high reflector mirrors defining a resonator cavity at a fundamental wavelength,
a first Nd-doped gain medium positioned in the resonator cavity, producing radiation at said fundamental wavelength,
a first diode pump supplying pump beam of up to a maximum power at a pump wavelength to the gain medium,
a Q-switch for pulsing the laser up to a maximum repetition rate
said resonator cavity and gain medium adapted to operate in a TEM00 mode at all pump power levels up to said maximum power,
a first nonlinear crystal situated within said resonant cavity producing a second harmonic beam;
a second nonlinear crystal situated within said resonant cavity producing a third harmonic beam; and
an outcoupler for extracting the third harmonic wavelength without damage said gain medium or other optical components within said resonant cavity;
wherein the second harmonic conversion efficiency is detuned from its maximum value.

23. The laser according to claim 22 wherein Nd gain medium comprises a material selected from one of the following: vanadate, YAG, YalO3 or YLF.

24. The laser according to claim 22 wherein output is circular.

25. The laser according to claim 22 wherein thermal lens of the laser cavity is less than about 12 D.

26. The laser according to claim 22 wherein the thermal lens is less than about 6 D.

27. The laser according to claim 22 wherein the fundamental beam diameter within the harmonic generator increases as the pump power is increased up to said maximum pump power.

28. The laser according to claim 22 wherein the pump wavelength is selected to provide direct excitation of the upper laser level of said gain medium.

29. The laser according to claim 22, wherein the cavity includes a third crystal producing a fourth harmonic.

30. The laser according to claim 22, wherein the cavity includes a second and third crystal producing a fifth harmonic.

31. The laser according to claim 22 wherein the first nonlinear crystal comprises LBO, KTP, KNbO3, CLBO, BBO.

32. The laser according to claim 22 wherein the first crystal comprised Type I LBO and the second crystal is Type II LBO.

33. The laser according to claim 22 wherein the means for outcoupling the third harmonic comprises one or more dichroically coated optic.

34. The laser according to claim 22 wherein the means for outcoupling the third harmonic comprises a combination of dispersive surface and a dichroic optic.

35. The laser according to claim 22 wherein the means for outcoupling the third harmonic comprises a combination of at least two angled dichroically coated optics.

36. The laser according to claim 22 further including means for suppressing harmonic feed-back through the gain medium and associated cavity optics.

37. The laser according to claim 22 wherein the third harmonic is obtained with efficiency greater than 25% relative to the absorbed pump power.

38. The laser according to claim 22 wherein the second harmonic is detuned by means of crystal length selection.

39. A diode pumped intracavity converted laser comprising:
at least two reflector mirrors defining a resonator cavity at a fundamental wavelength,
a first gain medium positioned in the resonator cavity, producing radiation at said fundamental wavelength,
a first diode pump supplying pump beam of up to a maximum power at a pump wavelength to the gain medium,
a Q-switch for pulsing the laser up to a maximum repetition rate,
a first harmonic wavelength generator situated within said resonant cavity and optically coupled to it through at least one high reflecting coated optic,
a second harmonic wavelength generator situated within said resonant cavity and optically coupled to it through at least one high reflecting coated optic, and
means for outcoupling the desired harmonic wavelength without damage to optical components within said cavity,
wherein said resonator cavity and gain medium are adapted to operate in a TEM00 mode in the presence of at least one intracavity lens configured and positioned to create a different spot sizes in said first and second harmonic generators, said spot size selected to optimize overall conversion.

40. A diode pumped intracavity converted laser comprising:
at least two reflector mirrors defining a resonator cavity at a fundamental wavelength,
a first gain medium positioned in the resonator cavity, producing radiation at said fundamental wavelength,
a first diode pump supplying at least one pump beam of up to a maximum power at a pump wavelength to the gain medium, a Q-switch for pulsing the laser up to a maximum repetition rate, a first harmonic wavelength generator situated within said resonator cavity and optically coupled thereto through at least one highly reflecting coated optic, a second harmonic wavelength generator situated within said resonator cavity and optically coupled thereto through at least one highly reflecting coated optic, and a beam separator element positioned within the resonator cavity and configured to outcouple a desired harmonic wavelength without damage to optical components positioned within said cavity, wherein the output of a frequency tripled wavelength is achieved with an efficiency greater than about 17% relative to the pump power absorbed in said gain medium.

41. A diode pumped intracavity laser comprising:

at least two mirrors defining a resonator cavity at a fundamental wavelength, a first gain medium positioned in the resonator cavity, producing radiation at said fundamental wavelength, a first diode pump supplying at least one pump beam of up to a maximum power -at a pump wavelength to the gain medium, a Q-switch for pulsing the laser up to a maximum repetition rate, at least one harmonic wavelength generator situated within said resonator cavity and optically coupled thereto through at least one dichroically coated optic, at least one angled dichroically coated optic positioned within the resonator cavity and configured to output a selected harmonic wavelength from said resonator cavity without damage to optical components within said resonator cavity, wherein a beam diameter of the fundamental wavelength in first harmonic wavelength generator is less than about 0.7 mm.

42. A diode pumped intracavity laser comprising:

at least two high reflector mirrors defining a resonator cavity at a fundamental wavelength, a first gain medium positioned in the resonator cavity, producing radiation at said fundamental wavelength, a first diode pump supplying at least one pump beam of up to a maximum power at a pump wavelength to the gain medium, a Q-switch for pulsing the laser up to a maximum repetition rate, at least one harmonic wavelength generator situated within said resonantor cavity and optically coupled thereto through at least one dichroically coated optic, and a beam separation element comprising a combination of at least one dispersive surface and at least one dichroic optic positioned within the resonator cavity and configured to deflect a selected harmonic wavelength out of said resonator cavity without producing damaging leakage to said gain medium or optical components within said cavity.

* * * * *